US005867720A

United States Patent [19]
Hirano

[11] Patent Number: 5,867,720
[45] Date of Patent: Feb. 2, 1999

[54] PRINTING APPARATUS AND A METHOD THEREFOR, AND INFORMATION PROCESSING APPARATUS AND A METHOD THEREFOR

[75] Inventor: Yoshiaki Hirano, Kawagoe, Japan

[73] Assignee: Canon Kabushiki Kaisha, Tokyo, Japan

[21] Appl. No.: 856,000

[22] Filed: May 14, 1997

Related U.S. Application Data

[63] Continuation of Ser. No. 755,132, Nov. 22, 1996, abandoned, which is a continuation of Ser. No. 163,757, Dec. 9, 1993, abandoned.

[30] Foreign Application Priority Data

Dec. 14, 1992 [JP] Japan ................................. 4-332751
Jun. 25, 1993 [JP] Japan ................................. 5-177619
Nov. 18, 1993 [JP] Japan ................................. 5-289357

[51] Int. Cl.$^6$ ................................................. G06F 1/32
[52] U.S. Cl. .................................. 395/750.06; 395/856
[58] Field of Search ..................... 395/750.02, 750.06, 395/750.05, 856, 858, 840, 750.03

[56] References Cited

U.S. PATENT DOCUMENTS

| 4,631,418 | 12/1986 | Toyomura | 395/750 |
|---|---|---|---|
| 4,694,393 | 9/1987 | Hirano et al. | 395/750 |
| 4,794,525 | 12/1988 | Pcikert et al. | 395/750 |
| 4,980,836 | 12/1990 | Carter et al. | 364/483 |
| 5,051,720 | 9/1991 | Kittirutsunetorn | 340/310.02 |
| 5,239,652 | 8/1993 | Seibert et al. | 395/750 |
| 5,339,445 | 8/1994 | Gasztonyi | 395/750 |
| 5,396,635 | 3/1995 | Fung | 395/800 |
| 5,404,546 | 4/1995 | Stewart | 395/750 |
| 5,408,668 | 4/1995 | Tornai | 395/750 |
| 5,410,713 | 4/1995 | White et al. | 395/750 |
| 5,465,366 | 11/1995 | Heineman | 395/750 |
| 5,477,476 | 12/1995 | Schanin et al. | 364/707 |

FOREIGN PATENT DOCUMENTS 03168820  7/1991  Japan ................................. G06F 1/26

OTHER PUBLICATIONS

"HP LaserJet Printer User's Manual", Hewlett–Packard Company, 1993, pp. 2–5.

Primary Examiner—Glenn A. Auve
Attorney, Agent, or Firm—Fitzpatrick, Cella, Harper & Scinto

[57] ABSTRACT

A printing apparatus includes an output unit for providing a printout by generating output information from input information received from an information processing apparatus, and a power consumption control unit for controlling power consumption of the entire printing apparatus by controlling electric power supply to the output unit based on information received from the information processing apparatus. An information outputting apparatus includes an output unit for outputting information to an output apparatus using a wire system or a radio system, and a control unit for controlling the output unit by switching between the wire system and the radio system in accordance with a transmission/reception relationship between an information processing apparatus and the output apparatus.

37 Claims, 31 Drawing Sheets

FIG.18
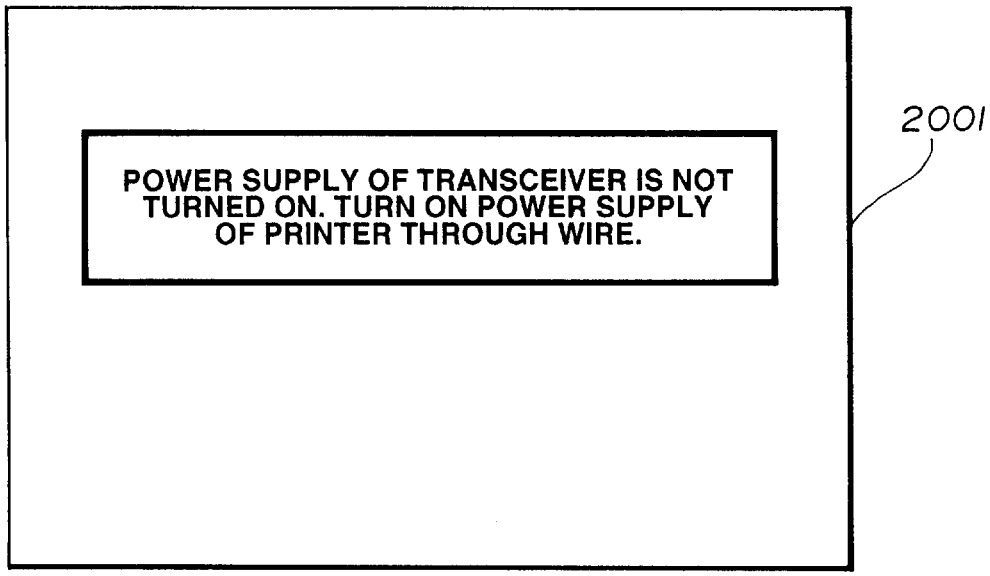
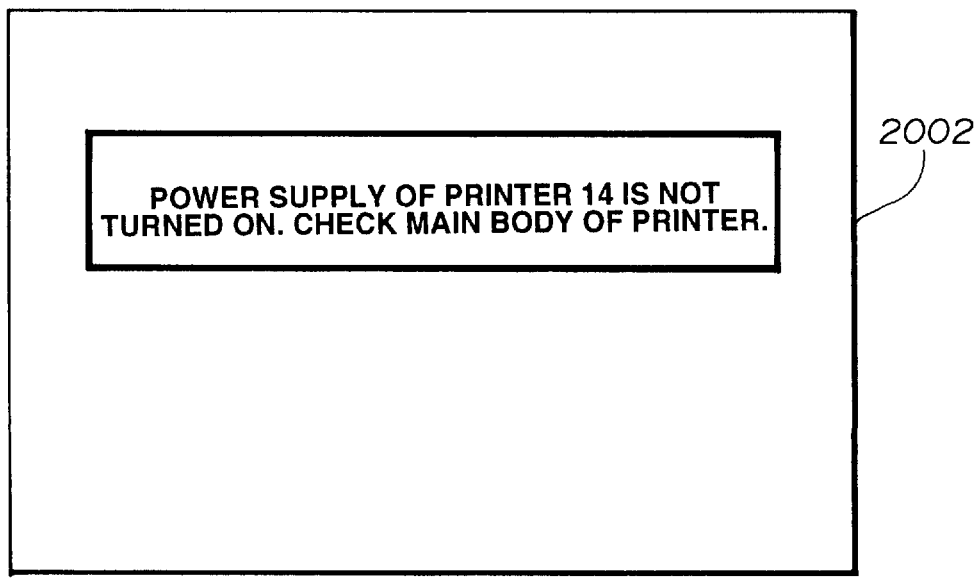

PRINTING APPARATUS AND A METHOD THEREFOR, AND INFORMATION PROCESSING APPARATUS AND A METHOD THEREFOR

This application is a continuation of application Ser. No. 08/755,132 filed Nov. 22, 1996 now abandoned, which is a continuation of application Ser. No. 08/163,757, filed Dec. 9, 1993, now abandoned.

BACKGROUND OF THE INVENTION

1. Field of the Invention

This invention relates to a printing apparatus and a method therefor, in which input information, comprising control codes, character codes and the like, is received from an information processing apparatus, such as a host computer or the like, and output information is generated and output.

The invention also relates to an information processing apparatus, such as a host computer or the like, and a method therefor, for outputting input information, comprising control codes, character codes and the like, and commands are output to an output apparatus, such as a printing apparatus or the like.

2. Description of the Related Art

Printing systems have been known in which printing is performed by transmitting data by a radio system from an information processing apparatus, such as a host computer or the like, to a printing apparatus. FIG. 29 shows the configuration of such a radio communication apparatus and a conventional printing system utilizing the apparatus. In FIG. 29, host computer 1 transmits printing data to printing apparatus 4. Reference numeral 2 represents a transmission/reception block at the side of host computer 1, and reference numeral 3 represents a transmission/reception block at the side of printing apparatus 4. Printing apparatus 4 prints an image on a recording medium, such as recording paper or the like, based on the printing data received from host computer 1.

In transmission/reception block 2, reference numeral 6-1 represents a transmission/reception unit for exchanging data, commands, status information and the like with host computer 1. Transmission/reception unit 6-1 modulates a signal from host computer 1 and transmits the resultant signal to antenna 26-1, or inputs a modulated signal received by antenna 26-1, demodulates the signal, and transmits the resultant signal to host computer 1. Power supply unit 7-1 applies a DC voltage to transmission/reception unit 6-1. An AC voltage is applied to power supply unit 7-1 via AC receptacle 5-1 and power switch 8-1. Transmission/reception block 3 at the side of printing apparatus 4 also has the same configuration. Printing apparatus 4 also includes power supply unit 10 for applying a DC voltage to circuitry within the apparatus. An AC voltage is applied to power supply unit 10 via AC receptacle 5-3 and power switch 8-3.

In the above-described conventional system, a power supply unit and a power switch are provided in each of the blocks 2 and 3, and printing apparatus 4. Hence, when starting the printing system, the operator must go to the places where the respective apparatuses are installed, and turn on or off power switches of the respective apparatuses. Such a starting operation is very troublesome especially when host computer 1 and printing apparatus 4 are installed at separate places.

A printing apparatus of this kind is designed assuming that the user is present in the vicinity of the printing apparatus, whether it is operated by a wire system or by a radio system. Hence, the power supply of the apparatus is controlled in such a way that the user performs a direct physical operation of the power switch and the like of the apparatus.

In the above-described conventional approach, especially when a plurality of information processing apparatuses are connected to the printing apparatus, or when the printing apparatus is not in the vicinity of the information processing apparatuses, as in a network environment, power is, in many cases, always supplied to the power supply of the printing apparatus even if the apparatus is not being used.

In such a case, the ratio of power consumption in a standby state to the total power consumption of the apparatus has a large value, causing a problem from the viewpoint of energy saving.

Furthermore, when a plurality of information processing apparatuses are connected to the printing apparatus by a radio (a system using a radio information transceiver), for some apparatuses, and by a wire system (a system using interface cables), for other apparatuses, the information processing apparatus side cannot output information to the printing apparatus and the like by switching between the radio system and the wire system in accordance with the system environment.

SUMMARY OF THE INVENTION

It is an object of the present invention to control power consumption of the entire printing apparatus based on received information.

According to one aspect, the present invention which achieves this object relates to a printing apparatus comprising output means for providing a printout by generating output information from input information received from an information processing apparatus, and power consumption control means for controlling power consumption of the entire printing apparatus by controlling electric power supply to the output means based on information received from the information processing apparatus.

According to another aspect, the present invention which achieves this object relates to a printing method which controls power consumption of the entire printing apparatus by controlling electric power supply to output means, for providing a printout by generating output information from input information received from an information processing apparatus, based on information received from the information processing apparatus.

It is a further object of the present invention to detect a reception status of received information, and control power consumption of the entire printing apparatus based on a result of the detection.

According to one aspect of this further object, the present invention which achieves this object relates to a printing apparatus comprising output means for providing a printout by generating output information from input information received from an information processing apparatus, detection means for detecting a status of information reception from the information processing apparatus, and power consumption control means for controlling power consumption of the entire printing apparatus by controlling electric power supply to the output means based on a result of the detection by the detection means.

According to another aspect of this further object, the present invention which achieves this object relates to a printing method which detects a status of information reception from an information processing apparatus, and controls power consumption of the entire printing apparatus by controlling electric power supply to output means, for providing a printout by generating output information from input information received from the information processing apparatus, based on a result of the detection processing.

It is a still further object of the present invention to interrupt electric power supply when input information has not been received for a predetermined time period.

According to one aspect of this further object, the present invention which achieves this object relates to a printing apparatus comprising output means for providing a printout by generating output information from input information received from an information processing apparatus, and power supply control means for interrupting electric power supply to the output means when input information has not been received from the information processing apparatus for a predetermined time period.

According to another aspect of this still further object, the present invention which achieves this object relates to a printing method which interrupts electric power supply to the output means, for providing a printout by generating output information from input information received from an information processing apparatus, when input information has not been received from the information processing apparatus for a predetermined time period.

It is still another object of the present invention to start electric power supply when input information has been received in a state in which electric power supply is interrupted.

According to one aspect of this object, the present invention relates to a printing apparatus comprising output means for providing a printout by generating output information from input information received from an information processing apparatus, and power supply control means for starting electric power supply to the output means when the input information has been received from the information processing apparatus in a state in which electric power supply to the output means is interrupted.

According to another aspect of this object, the present invention relates to a printing method which starts electric power supply to output means, for providing a printout by generating output information from input information received from an information processing apparatus, when the input information has been received from the information processing apparatus in a state in which electric power supply to the output means is interrupted.

It is still a further object of the present invention to output information to an output apparatus by switching between a wire system and a radio system in accordance with a transmission/reception relationship.

According to one aspect of this further object, the present invention which achieves this object relates to an information processing apparatus comprising output means for outputting information to an output apparatus using a wire system or a radio system, and control means for controlling the output means by switching between the wire system and the radio system in accordance with a transmission/reception relationship between the information processing apparatus and the output apparatus.

According to another aspect of this further object, the present invention which achieves this object relates to an information processing method which determines a transmission/reception relationship between an information processing apparatus and an output apparatus, and outputs information to the output apparatus by switching between a wire system and a radio system in accordance with a result of the determination.

The foregoing and other objects, advantages and features of the present invention will become more apparent from the following description of the preferred embodiments taken in conjunction with the accompanying drawings.

BRIEF DESCRIPTION OF THE DRAWINGS

FIG. 18 illustrates contents displayed on a CRT of the host computer;

DESCRIPTION OF THE PREFERRED EMBODIMENTS

Preferred embodiments of the present invention will now be described in detail with reference to the drawings.

Figure 1:
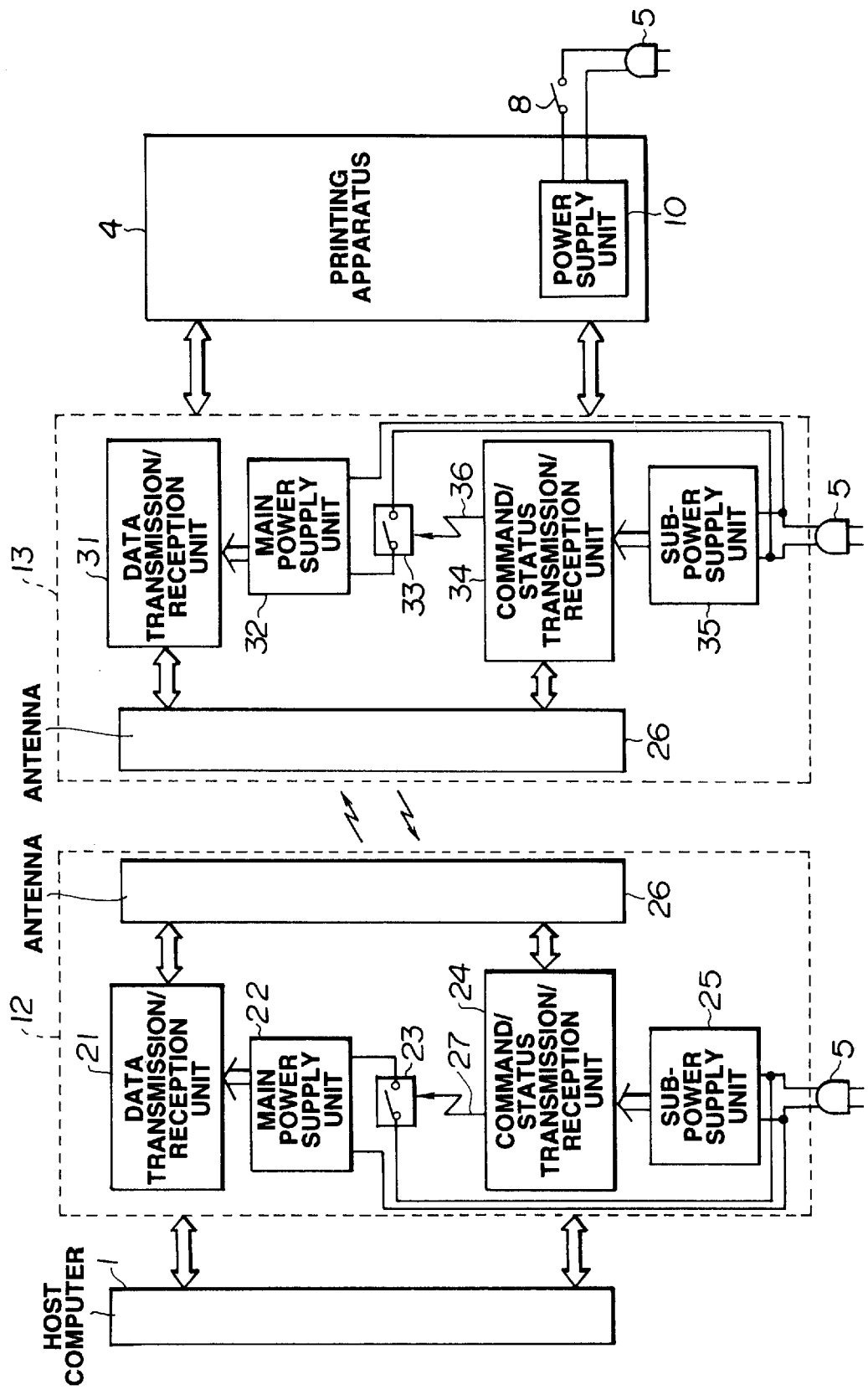
FIG. 1 is a block diagram illustrating a schematic configuration of a printing system according to an embodiment of the present invention.
Figure 29:
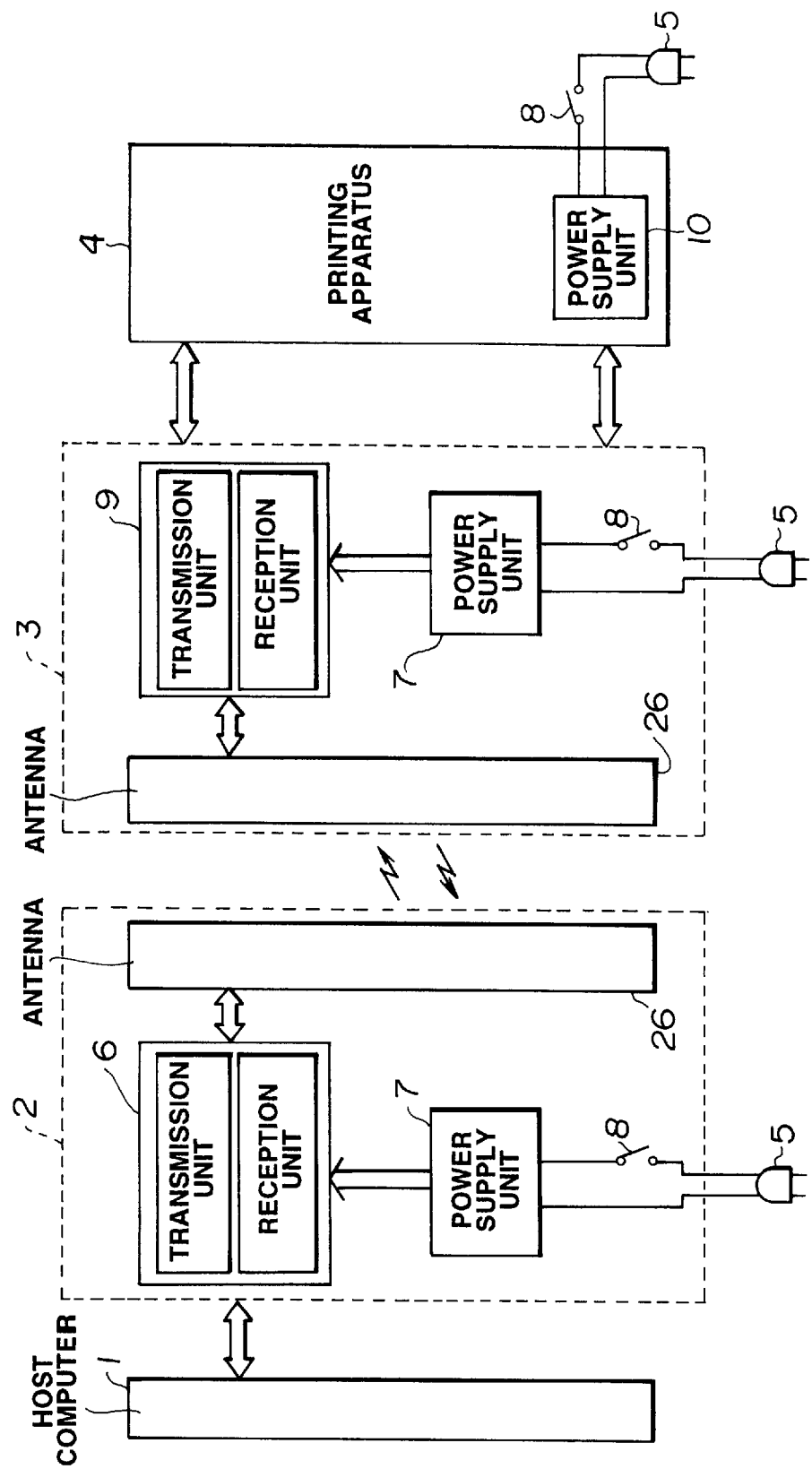
FIG. 29 is a block diagram illustrating a schematic configuration of a conventional printing system.

FIG. 1 is a block diagram illustrating a schematic configuration of a printing system according to a first embodiment of the present invention. In FIG. 1, the same units as those shown in FIG. 29 are indicated by the same reference numerals, and an explanation thereof will be omitted.

In FIG. 1, reference numeral 12 represents a transmission/reception block at the side of host computer 1, and reference numeral 13 represents a transmission/reception block at the side of printing apparatus 4. In transmission/reception block 12, data transmission/reception block 21 modulates data from host computer 1 and transmits the modulated data to antenna 26-1, or demodulates a modulated signal from antenna 26-1 and transmits the demodulated signal to host computer 1. Main power supply unit 22 applies a DC voltage to data transmission/reception unit 21. Power supply switch 23 switches on and off an AC voltage applied to main power supply unit 22 in response to signal 27 from command/status transmission/reception unit 24. Command/status transmission/reception unit 24 modulates command data from host computer 1 and outputs the modulated data to antenna 26-1, or demodulates a modulated signal from antenna 26-1 and transmits the demodulated signal to host computer 1 as status data. Sub-power supply unit 25 applies a DC voltage to command/status transmission/reception unit 24. An AC voltage is always applied to this sub-power supply unit 25 via AC receptacle 5-1.

Power supply switch 23 is controlled by signal 27 from command/status transmission/reception unit 24. When a command "turn on the power supply of the radio apparatus" is transmitted from host computer 1, this command is interpreted by command/status transmission/reception unit 24, and signal 27 is output as an "on" signal. Power supply switch 23 is thereby switched on. When a command "turn off the power supply of the radio apparatus" is transmitted from host computer 1, the command is interpreted by command/status transmission/reception unit 24, and signal 27 is output as an "off" signal, whereby power supply switch 23 is switched off.

A power-supply-on/off command transmitted from host computer 1 is output by antenna 26-1 after being modulated by command/status transmission/reception unit 24, and is input to command/status transmission/reception unit 34 within transmission/reception block 13 at the side of printing apparatus 4. The configuration of this transmission/reception block 13 is substantially the same as the configuration of the transmission/reception block 12 at the side of host computer 1. That is, power is always supplied to command/status transmission/reception unit 34 via sub-power supply unit 35, and power supply switch 33 is switched on and off by making signal 36 an "on" signal and an "off" signal by power-supply-on/off commands from host computer 1 received via antenna 26-2. When power supply switch 33 is switched on, power is supplied from main power supply unit 32 to data transmission/reception unit 31 to provide a state in which data from host computer 1 can be transmitted to printing apparatus 4 by a radio system.

Figure 2:
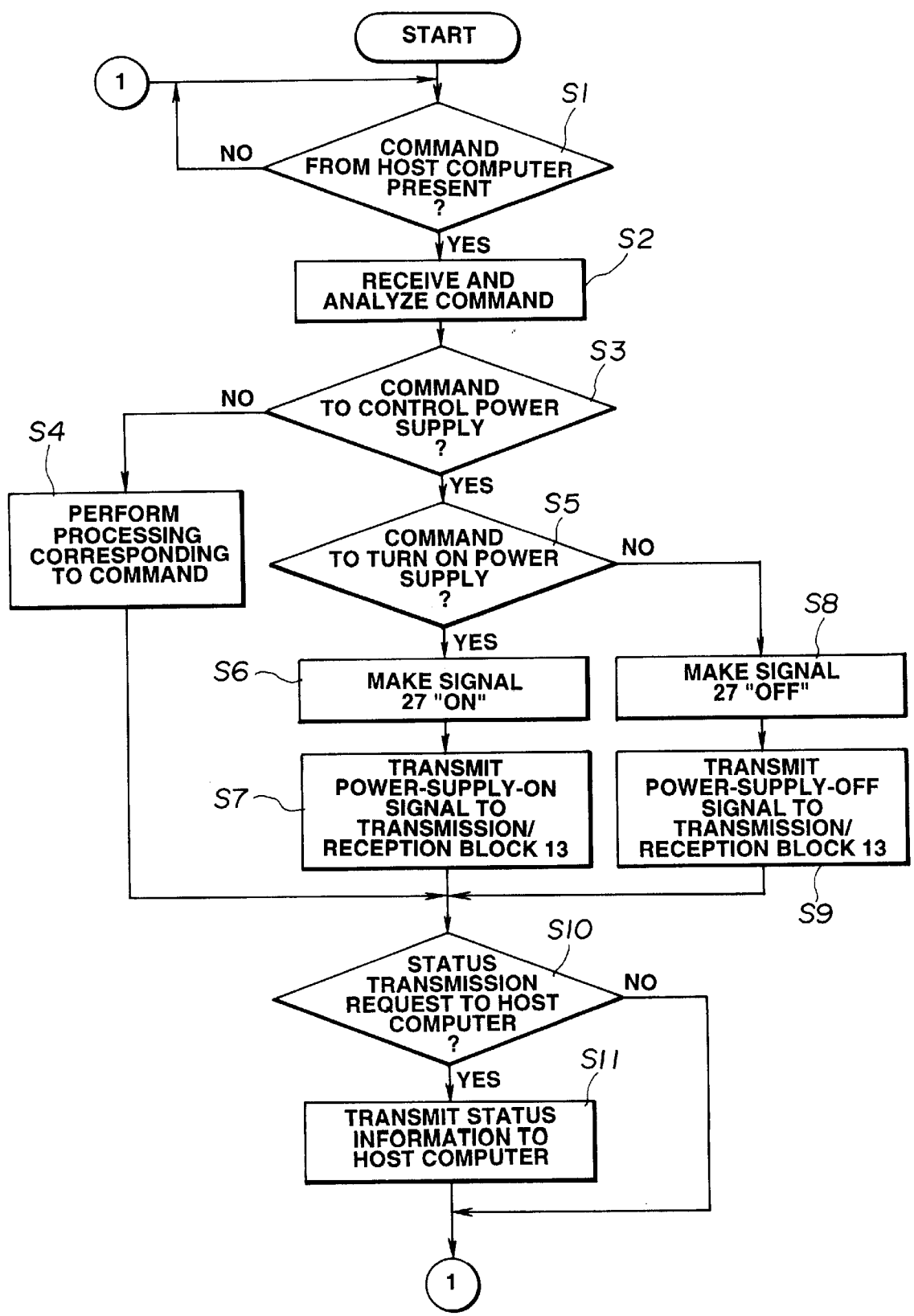
FIG. 2 is a flowchart illustrating the operation of command-status transmission/reception unit 24 of transmission/reception block 12 shown in FIG. 1.

FIG. 2 is a flowchart illustrating the operation of command/status transmission/reception unit 24 of transmission/reception block 12. A description will be provided of the operation of command/status transmission/reception unit 24 with reference to the flowchart shown in FIG. 2.

Figure 16:
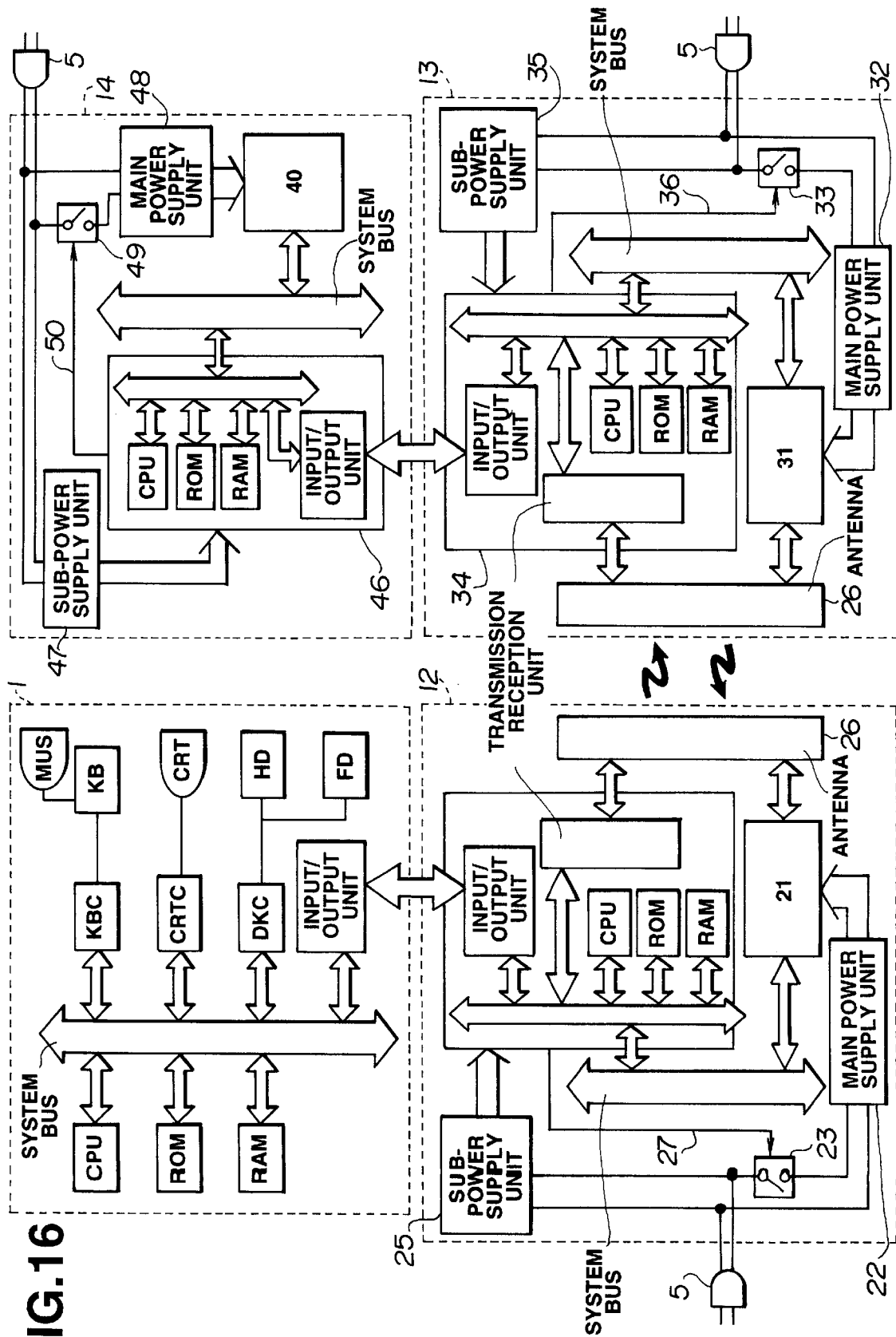
FIG. 16 includes block diagrams illustrating a specific configuration of the printing system shown in FIG. 3.

The operation program shown in the flowchart of FIG. 2 is stored in a ROM (read-only memory) within command/status transmission/reception unit 24, as illustrated in FIG. 16. A CPU (central processing unit) within command/status transmission/reception unit 24 controls the following operation based on this program. A RAM (random access memory) within command/status transmission/reception unit 24 is used as a work memory and the like.

First, in step S1, the CPU determines if a command from host computer 1 has been received within the RAM. If the result of the determination is affirmative, the process proceeds to step S2, in which the command is received and analyzed. In step S3, the CPU determines if the received command is a command to control the power supply. If the result of the determination is negative, the process proceeds to step S4, in which a control corresponding to the received command is executed.

If the result of the determination in step S3 is affirmative, the process proceeds to step S5, in which the CPU determines if the command is a command to turn on the power supply. If the result of the determination is affirmative, the process proceeds to step S6, in which signal 27 is output by making it an "on" signal. Main power supply unit 22 is thereby turned on, whereby electric power is supplied to data transmission/reception unit 21 to provide a state in which data from host computer 1 can be received. The process then proceeds to step S7, in which a power-supply-on signal is transmitted to transmission/reception block 13. Power supply switch 33 of transmission/reception block 13 at the side of printing apparatus 4 is thereby switched on, so that data can be transmitted and received between transmission/reception blocks 13 and 12.

If the received command is determined to be a power-supply-off command in step S5, the process proceeds to step S8, in which signal 27 is made to be an "off" signal and is output to power supply switch 23. Power supply switch 23 is thereby switched off, whereby main power supply unit 22 is turned off. The process then proceeds to step S9, in which a power-supply-off signal is transmitted to transmission/reception block 13. Power supply switch 33 is thereby switched off under the control of command/status transmission/reception unit 34 in transmission/reception block 13 at the side of printing apparatus 4.

The operation of command/status transmission/reception unit 34 of transmission/reception block 13 at the side of printing apparatus 4 can also be described in the same manner as the operation shown in the flowchart of FIG. 2. That is, in step S1, the CPU determines if a command from transmission/reception block 12 is present. If the command is a command to turn on the power supply, signal 36 is made to be an "on" signal in step S6, and signal 36 to switch on power supply switch 33 of main power supply unit 32 is output. If the command is a command to turn off the power supply, signal 36 is output in step S8 switch off power supply switch 33 of main power supply unit 32. The respective processes then proceed to step S10 without performing the processing of steps S7 and S9.

As described above, according to the first embodiment, the power supplies of transmission/reception blocks 12 and 13 are automatically turned on by a command from host computer 1, so that data can be transmitted and received between host computer 1 and printing apparatus 4.

By controlling the amount of electric power supply within transmission/reception block 12 or 13, it is possible to control the amount of electric power consumption in the entire transmission/reception block.

Figure 3:
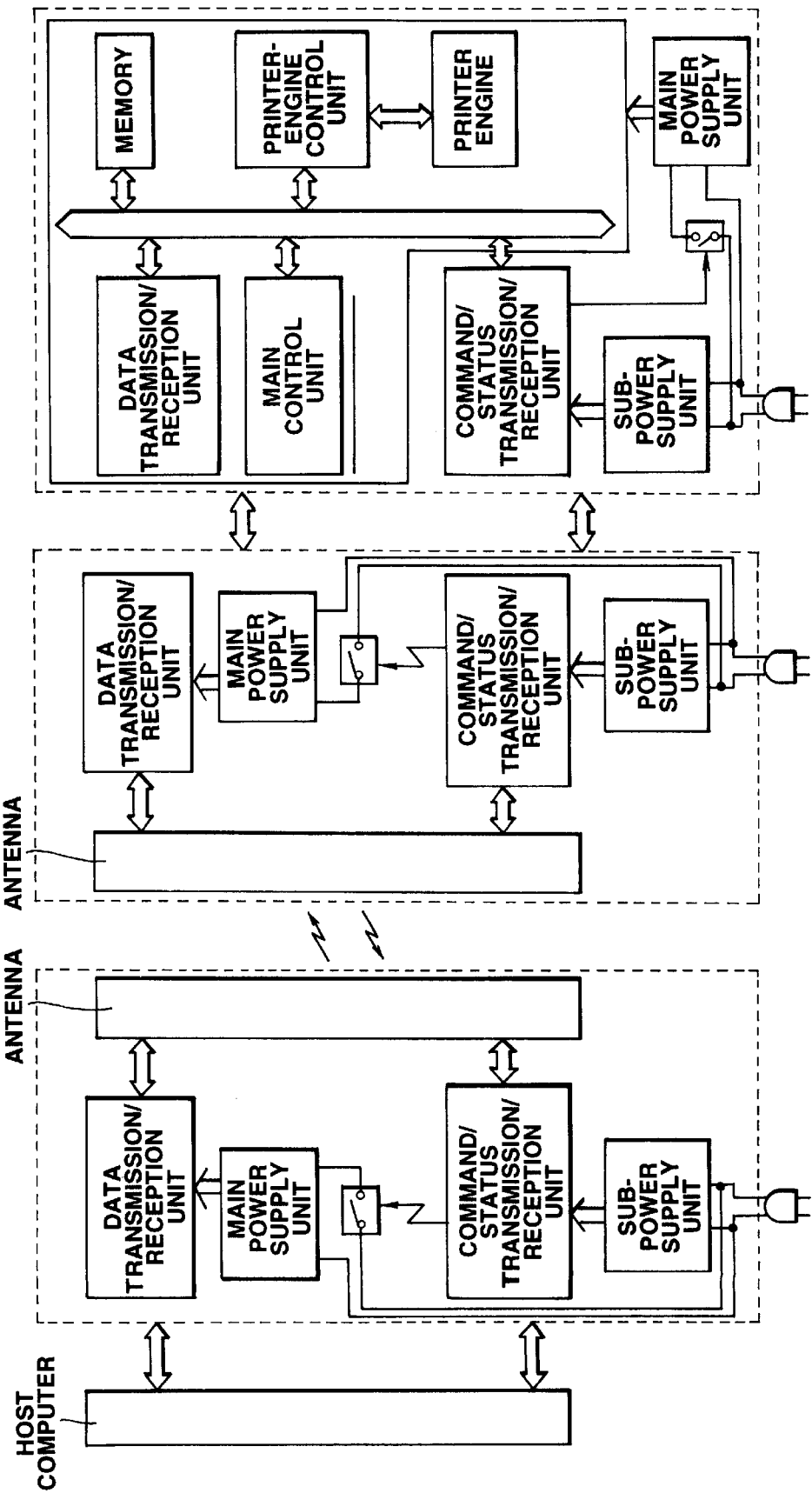
FIG. 3 is a block diagram illustrating a schematic configuration of a printing system according to another embodiment of the present invention.

FIG. 3 is a block diagram illustrating a schematic configuration of a printing system according to a second embodiment of the present invention. In FIG. 3, the same units as those shown in FIG. 1 are indicated by the same reference numerals, and an explanation thereof will be omitted. In the second embodiment, printing apparatus (printer) 14 is configured by providing command/status transmission/reception unit 46 and sub-power supply unit 47 in addition to data transmission/reception unit 41, so that the power supply of printing apparatus 14 can be automatically turned on by a power-supply-on command from host computer 1.

The configuration of printing apparatus 14 will now be described with reference to FIG. 3. Data transmission/reception unit 41 performs transmission/reception of various kinds of data, such as printing data and the like, with transmission/reception block 13. Main control unit 42, comprising a CPU and the like, controls the entire printing apparatus 14. Memory 43 comprises a RAM for storing printing data in units of a page, and for temporarily storing various kinds of data, and a ROM for storing control programs for the entire printing apparatus 14. Printer-engine control unit 44 controls the operation of printer engine 45. A DC voltage is applied to the data transmission/reception unit 41, main control unit 42, memory 43, printer-engine control unit 44, printer engine 45 and the like from main power supply unit 48. An AC voltage is applied to main power supply unit 48 via power supply switch 49 and AC receptacle 5-3.

A "power-supply-on/off command" transmitted from host computer 1 via transmission/reception blocks 12 and 13 is received by command/status transmission/reception unit 46 of printing apparatus (printer) 14. The command/status transmission/reception unit 46 controls signal 50 in accordance with the contents of the power-supply-on/off command. The switching on and off of power supply switch 49 is controlled by this signal 50. Main power supply unit 48 of printing apparatus 14 is subjected to on/off control by the power supply switch 49. Accordingly, by controlling electric power consumption of the entire printing apparatus 14, electric power consumption of printing apparatus 14 in a standby state (when a printing operation is not performed) can, for example, be reduced.

Figure 4:
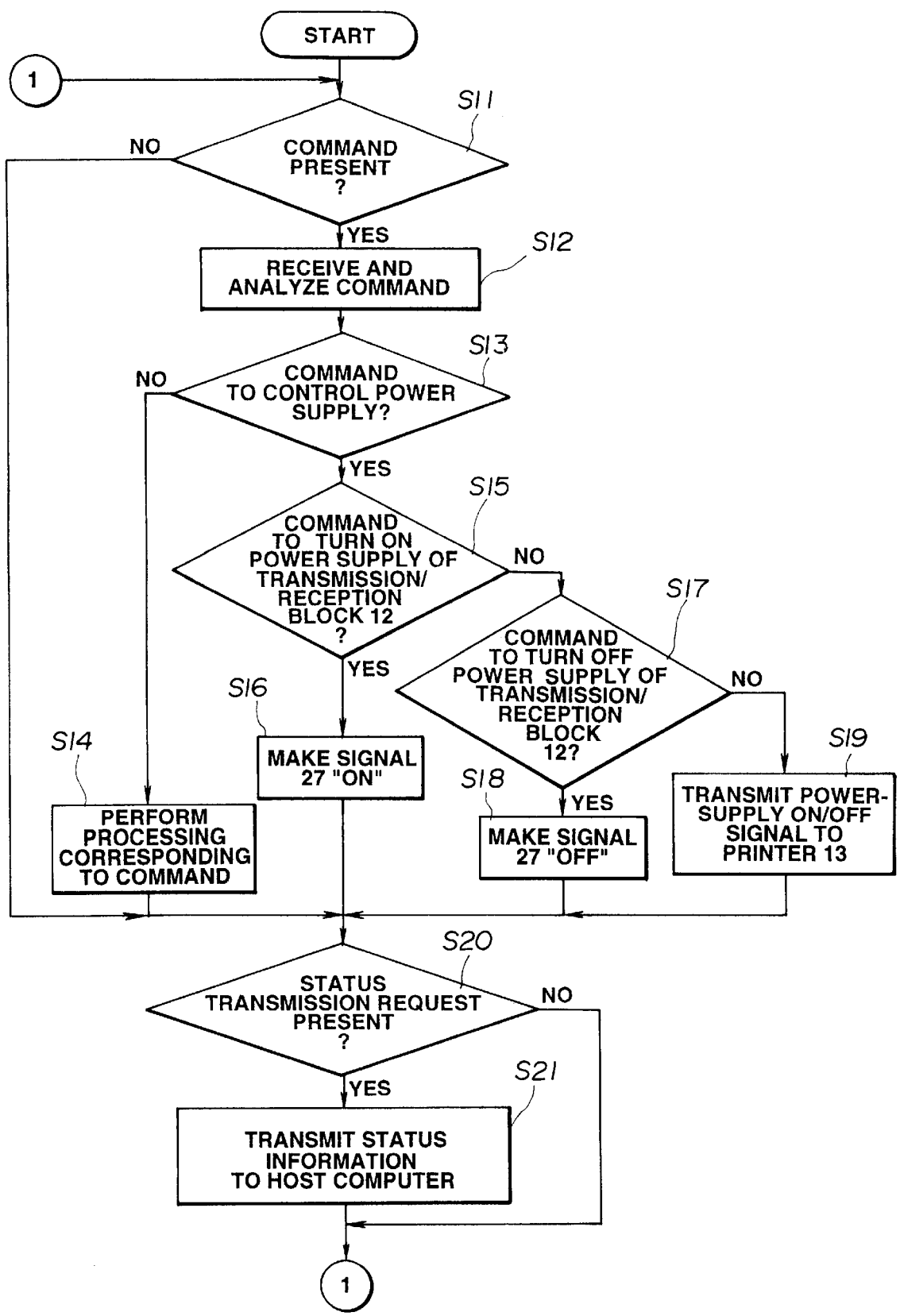
FIG. 4 is a flowchart illustrating the operation of command/status transmission/reception unit 24 of transmission/reception block 12 shown in FIG. 3.

FIG. 4 is a flowchart illustrating the operation of command/status transmission/reception unit 24 of transmission/reception block 12 shown in FIG. 3. The operation of command/status transmission/reception unit 24 will now be described with reference to the flowchart shown in FIG. 4.

The program shown in the flowchart of FIG. 4 is stored in a ROM within command/status transmission/reception unit 24, as shown in FIG. 16. A CPU within command-status transmission/reception unit 24 controls the following operation based on this program.

First, in step S11, the CPU determines if a command from host computer 1 has been received within the RAM. If the result of the determination is affirmative, the process proceeds to step S12, in which the command is received and analyzed. If the result of the determination in step S11 is negative, the process proceeds from step S11 to step S20. In step S13, the CPU determines if the received command is a command to control the power supply. If the result of the determination is negative, the process proceeds to step S14, in which a control corresponding to the received command is executed.

If the result of the determination in step S13 is affirmative, the process proceeds to step S15, in which the CPU determines if the received command is a command to turn on the power supply of transmission/reception block 12. If the result of the determination is affirmative, the process proceeds to step S16, in which signal 27 is made to be an "on" signal to switch on switch 23, whereby main power supply 22 is turned on to supply electric power to data transmission/reception unit 21, so that data can be transmitted to and received from host computer 1 and transmission/reception block 13. If the result of the determination in step S15 is negative, the process proceeds to step S17, in which the CPU determines if the received command is a command to turn off the power supply of transmission/reception block 12. If the result of the determination is affirmative, the process proceeds to step S18, in which signal 27 is made to be an "off" signal to switch off switch 23, whereby main power supply unit 22 is turned off.

If the result of the determination in step S17 is negative, that is, if the received command is a power-supply-on/off command for transmission/reception block 13 or printer 14, the process proceeds to step S19, in which the power-supply-on/off command for transmission/reception block 13 or printer 14 is transmitted to transmission/reception block 13.

After the processing of step S14, S16, S18 or S19 has been completed, the process proceeds to step S20, in which the CPU determines if a status transmission request from host computer 1 is present. If the result of the determination is affirmative, the process proceeds to step S21, in which status data of transmission/reception block 12 or 13, or printer 14 is transmitted to host computer 1. If the result of the determination in step S20 is negative, the process returns to step S11, and the above-described processing is repeated.

Accordingly, the power supply of transmission/reception block 12 is subjected to on/off control in accordance with a command input from host computer 1. The power supplies of transmission/reception block 13 and printer 14 are also subjected to on/off control in accordance with the command input from host computer 1. Since electric power supply to the respective command/status transmission/reception units of transmission/reception blocks 12 and 13 and printer 14 is maintained, the power supply control request from host computer 1 is achieved.

Figure 5:
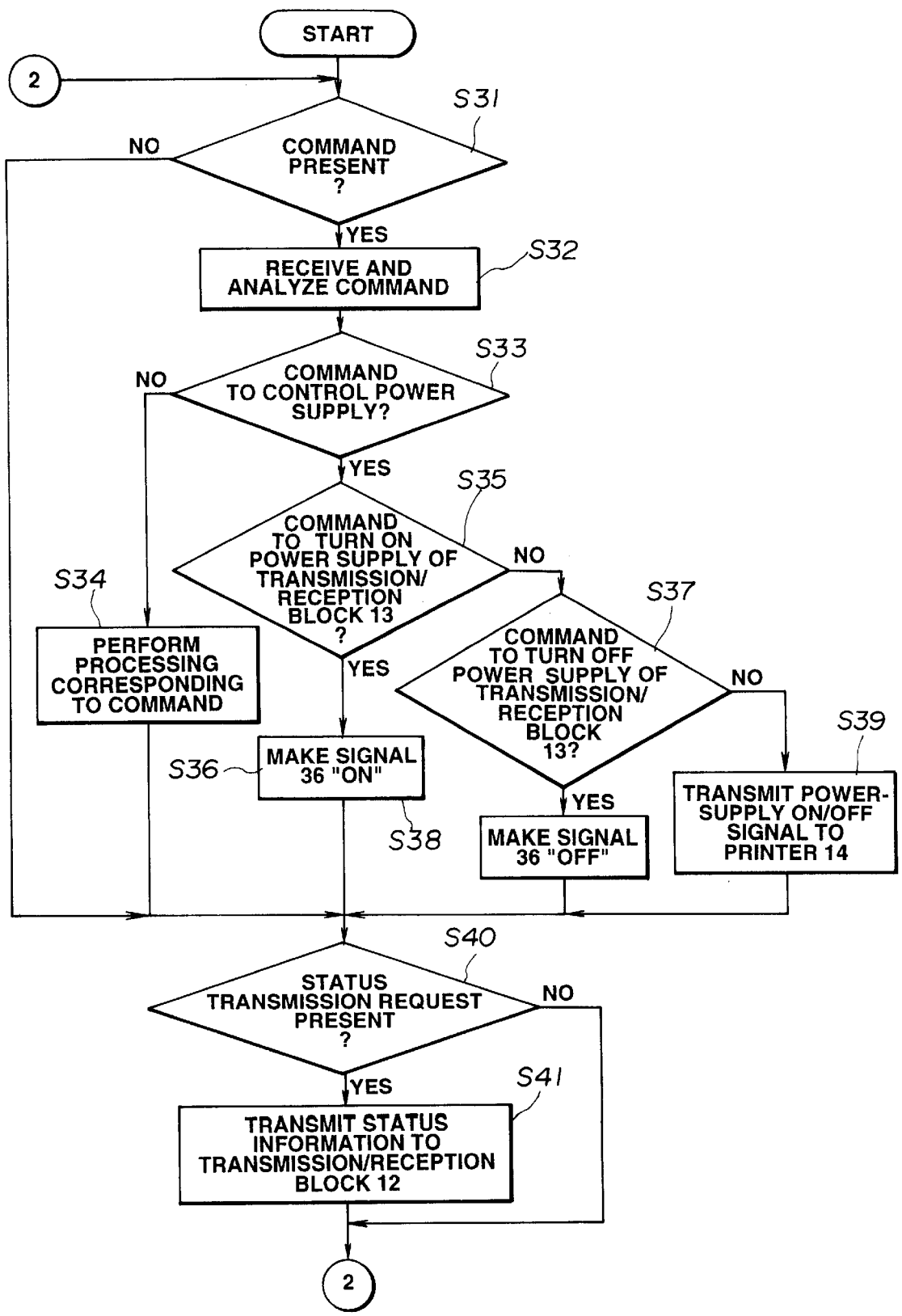
FIG. 5 is a flowchart illustrating the operation of command/status transmission/reception unit 34 of transmission/reception block 13 shown in FIG. 3.

FIG. 5 is a flowchart illustrating the operation of command/status transmission/reception unit 34 of transmission/reception block 13 shown in FIG. 3. The operation of command/status transmission/reception unit 34 will be described with reference to the flowchart shown in FIG. 5. The program shown in this flowchart is stored in the ROM, and the CPU controls the following operation based on the program.

In step S31, the CPU determines if a command from transmission/reception block 12 has been received within the RAM. If the result of the determination is affirmative, the process proceeds to steps S32, and further to S33. If the result of the determination is negative, the process proceeds to step S40.

In step S33, the CPU determines if the received command is a power supply control command. If the result of the determination is negative, the process proceeds to step S34. If the result of the determination is affirmative, the process proceeds to step S35.

In step S35, the CPU determines if the received command is a command to turn on the power supply of transmission/reception block 13. If the result of the determination is affirmative, the process proceeds to step S36, in which signal 36 is made to be an "on" signal to switch on switch 33, whereby main power supply unit 32 is turned on to supply electric power to data transmission/reception unit 31, so that data can be transmitted to and received from transmission/reception block 12 and printer 14. If the result of the determination in step S35 is negative, the process proceeds to step S37, in which the CPU determines if the received command is a command to turn off the power supply of transmission/reception block 13. If the result of the determination is affirmative, the process proceeds to step S38, in which signal 36 is made to be an "off" signal to switch off switch 33, whereby main power supply unit 32 is turned off.

If the result of the determination in step S37 is negative, that is, if the received command is a power-supply-on/off command for printer 14, the process proceeds to step S39, in which the power-supply-on/off command for printer 14 is transmitted to printer 14.

After the processing of step S34, S36, S38 or S39 has been completed, the process proceeds to step S40, in which the CPU determines if a status transmission request from transmission/reception block 12 is present. If the result of the determination is affirmative, the process proceeds to step S41, in which requested status data of transmission/reception block 13 or printer 14 is transmitted to transmission/reception block 12. If the result of the determination in step S40 is negative, the process returns to step S31, and the above-described processing is repeated.

Accordingly, the power supply of transmission/reception block 13 is subjected to on/off control in accordance with a command input from transmission/reception block 12. The power supply of printer 14 is also subjected to on/off control in accordance with the command input from transmission/reception block 12. Since electric power supply to the respective command/status transmission/reception units of transmission/reception blocks 13 and printer 14 is maintained, the power supply control request input via transmission/reception block 12 is achieved.

Figure 6:
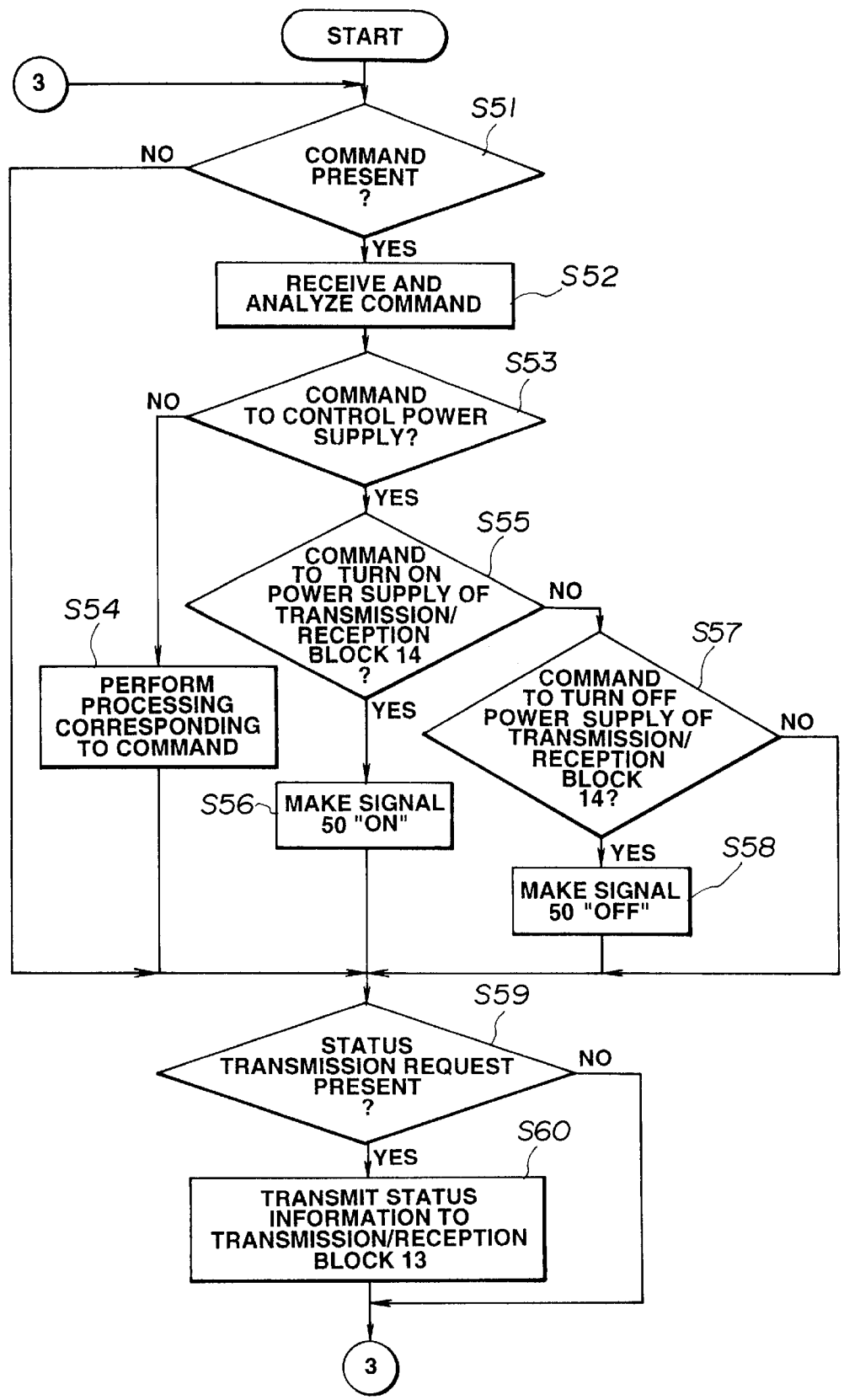
FIG. 6 is a flowchart illustrating the operation of command/status transmission/reception unit 46 of printer 14 shown in FIG. 3.

FIG. 6 is a flowchart illustrating the operation of command/status transmission/reception unit 46 of printer 14 shown in FIG. 3. The operation of command/status transmission/reception unit 46 will be described with reference to the flowchart shown in FIG. 6. The program shown in this flowchart is stored in the ROM, and the CPU controls the following operation based on the program.

In step S51, the CPU determines if a command from transmission/reception block 13 has been received within the RAM. If the result of the determination is affirmative, the process proceeds to steps S52, and further to S53. If the result of the determination is negative, the process proceeds to step S59.

In step S53, the CPU determines if the received command is a power supply control command. If the result of the determination is negative, the process proceeds to step S54. If the result of the determination is affirmative, the process proceeds to step S55.

In step S55, the CPU determines if the received command is a command to turn on the power supply of printer 14. If the result of the determination is affirmative, the process proceeds to step S56, in which signal 50 is made to be an "on" signal to switch on switch 49, whereby main power supply unit 48 is turned on to supply electric power to data block 40, so that printer 14 can transmit and receive data. If the result of the determination in step S55 is negative, the process proceeds to step S57, in which the CPU determines if the received command is a command to turn off the power supply of printer 14. If the result of the determination is affirmative, the process proceeds to step S58, in which signal 50 is made to be an "off" signal to switch off switch 49, whereby main power supply unit 48 is turned off. If the result of the determination in step S57 is negative, the process proceeds to step S59.

After the processing of step S54, S56 or S58 has been completed, the process proceeds to step S59, in which the CPU determines if a status transmission request from transmission/reception block 13 is present. If the result of the determination is affirmative, the process proceeds to step S60, in which status data of printer 14 is transmitted to transmission/reception block 13. If the result of the determination in step S59 is negative, the process returns to step S51, and the above-described processing is repeated.

Accordingly, the power supply of printer 14 is subjected to on/off control in accordance with a command input from transmission/reception block 13. Since electric power supply to command/status transmission/reception unit 46 of printer 14 is maintained, the power supply control request input via transmission/reception block 13 is achieved.

Figure 7:
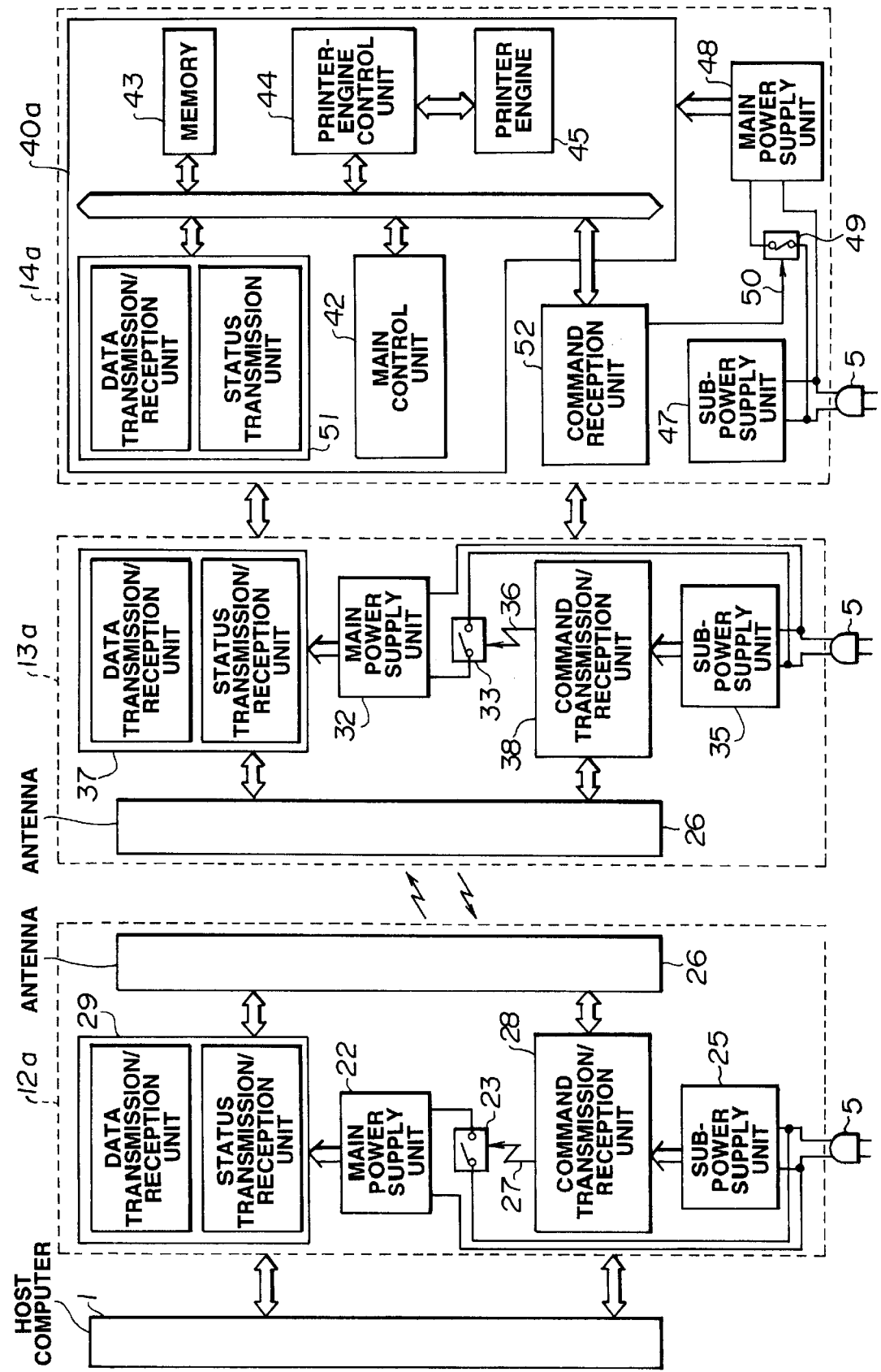
FIG. 7 is a block diagram illustrating a schematic configuration of a printing system according to still another embodiment of the present invention.

FIG. 7 is a block diagram illustrating a schematic configuration of a printing system according to another embodiment of the present invention. In FIG. 7, the same units as those shown in FIG. 3 are indicated by the same reference numerals. In this embodiment, the respective data transmission/reception units 21, 31 and 41, and the respective command/status transmission/reception units 24, 34 and 46 of the transmission/reception blocks 12 and 13 and the printing apparatus 14 are replaced by data/status transmission/reception units 29, 37 and 51, and command transmission/reception units 28, 38 and 52, respectively. Main power supply units 22, 32 and 48 of transmission/reception blocks 12a and 13a and printing apparatus 14a are subjected to on/off control based on a command from host computer 1 received via command transmission/reception units 28, 38 and 52, respectively.

Figure 8:
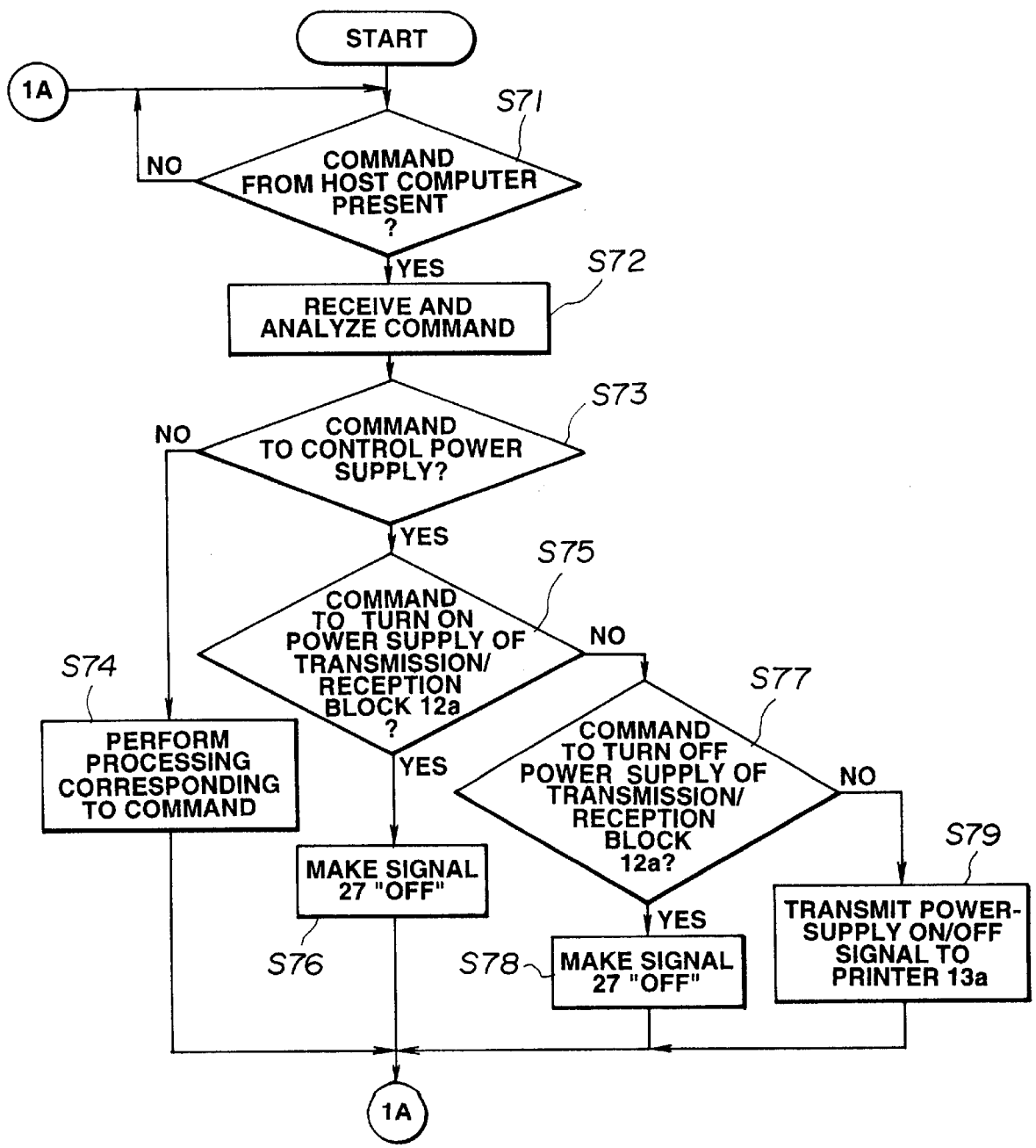
FIG. 8 is a flowchart illustrating the operation of command transmission/reception unit 28 of transmission/reception block 12a shown in FIG. 7.

FIG. 8 is a flowchart illustrating the operation of command transmission/reception unit 28 of transmission/ reception block 12a shown in FIG. 7. The operation of command transmission/reception unit 28 will now be described with reference to the flowchart shown in FIG. 8. The program shown in the flowchart of FIG. 8 is stored in the ROM. The CPU controls the following operation based on this program.

First, in step S71, the CPU determines if a command from host computer 1 has been received within the RAM. If the result of the determination is affirmative, the process proceeds to step S72, in which the command is received and analyzed. If the result of the determination in step S71 is negative, the process returns to the initial state.

In step S73, the CPU determines if the received command is a command to control the power supply. If the result of the determination is negative, the process proceeds to step S74, in which a control corresponding to the received command is executed.

If the result of the determination in step S73 is affirmative, the process proceeds to step S75, in which the CPU determines if the received command is a command to turn on the power supply of transmission/reception block 12a. If the result of the determination is affirmative, the process proceeds to step S76, in which signal 27 is made to an "on" signal to switch on switch 23, whereby main power supply 22 is turned on to supply electric power to data/status transmission/reception unit 29, so that data can be transmitted to and received from host computer 1 and transmission/reception block 13a. If the result of the determination in step S75 is negative, the process proceeds to step S77, in which the CPU determines if the received command is a command to turn off the power supply of transmission/reception block 12a. If the result of the determination is affirmative, the process proceeds to step S78, in which signal 27 is made to an "off" signal to switch off switch 23, whereby main power supply unit 22 is turned off.

If the result of the determination in step S77 is negative, that is, if the received command is a power-supply-on/off command for transmission/reception block 13a or printer 14a, the process proceeds to step S79, in which the power-supply-on/off command for transmission/reception block 13a or printer 14a is transmitted to transmission/reception block 13a.

After the processing of step S74, S76, S78 or S79 has been completed, the process returns to step S71, and the above-described processing is repeated.

Accordingly, the power supply of transmission/reception block 12a is subjected to on/off control in accordance with a command input from host computer 1. The power supplies of transmission/reception block 13a and printer 14a are also subjected to on/off control in accordance with the command input from host computer 1. Since electric power supply to the respective command transmission/reception units of transmission/reception blocks 13a and printer 14a is maintained, the power supply control request from host computer 1 is achieved.

Figure 9:
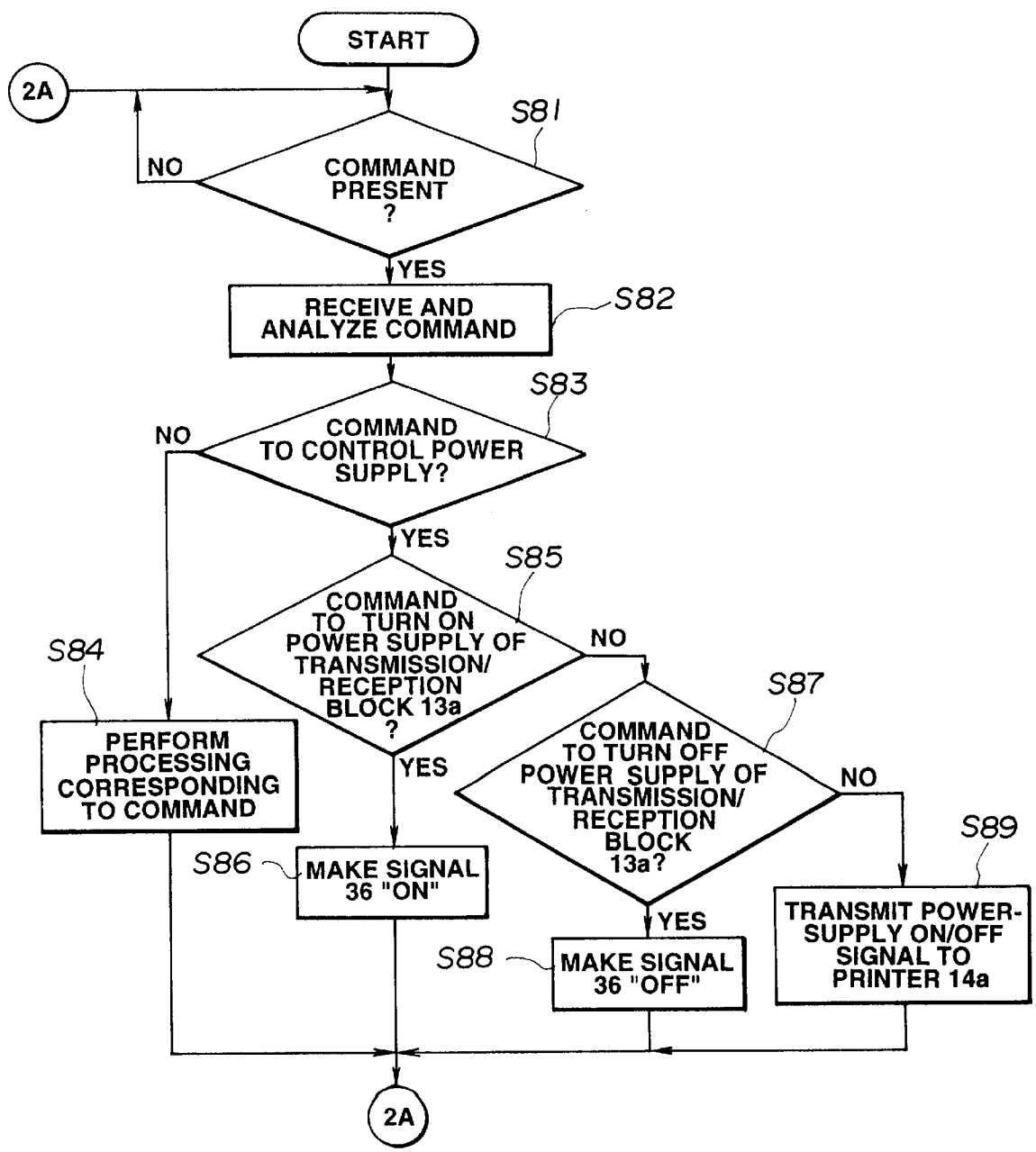
FIG. 9 is a flowchart illustrating the operation of command transmission/reception unit 38 of transmission/reception unit 13a shown in FIG. 7.

FIG. 9 is a flowchart illustrating the operation of command transmission/reception unit 38 of transmission/reception block 13a shown in FIG. 7. The operation of command/status transmission/reception unit 38 will be described with reference to the flowchart shown in FIG. 9.

In step S81, the CPU determines if a command from transmission/reception block 12a has been received within the RAM. If the result of the determination is affirmative, the proceeds to steps S82, and further to S83. If the result of the determination is negative, the process returns to the initial state.

In step S83, the CPU determines if the received command is a power supply control command. If the result of the determination is negative, the process proceeds to step S84. If the result of the determination is affirmative, the process proceeds to step S85.

In step S85, the CPU determines if the received command is a command to turn on the power supply of transmission/reception block 13a. If the result of the determination is affirmative, the process proceeds to step S86, in which signal 36 is made to be an "on" signal to switch on switch 33, whereby main power supply unit 32 is turned on to supply electric power to data/status transmission/reception unit 37, so that data can be transmitted to and received from transmission/reception block 12a and printer 14a. If the result of the determination in step S85 is negative, the process proceeds to step S87, in which the CPU determines if the received command is a command to turn off the power supply of transmission/reception block 13a. If the result of the determination is affirmative, the process proceeds to step S88, in which signal 36 is made to be an "off" signal to switch off switch 33, whereby main power supply unit 32 is turned off.

If the result of the determination in step S87 is negative, that is, if the received command is a power-supply-on/off command for printer 14a, the process proceeds to step S89, in which the power-supply-on/off command for printer 14a is transmitted to printer 14a.

After the processing of step S84, S86, S88 or S89 has been completed, the process returns to step S81, and the above-described processing is repeated.

Accordingly, the power supply of transmission/reception block 13a is subjected to on/off control in accordance with a command input from transmission/reception block 12a. The power supply of printer 14a is also subjected to on/off control in accordance with the command input from transmission/reception block 12a. Since electric power supply to the respective command transmission/reception units of transmission/reception blocks 13a and printer 14a is maintained, the power supply control request input via transmission/reception block 12a is achieved.

Figure 10:
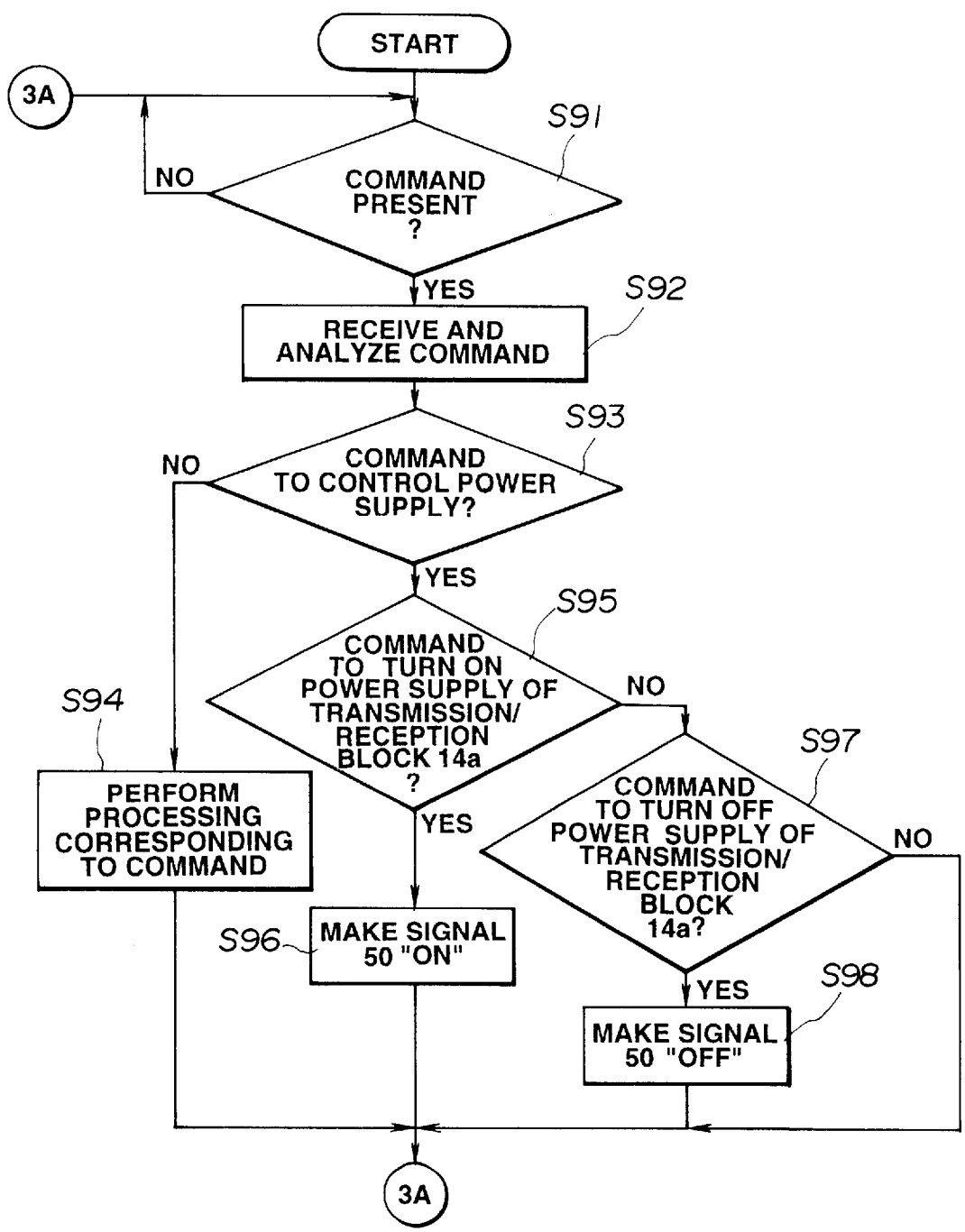
FIG. 10 is a flowchart illustrating the operation of command reception unit 52 of printer 14a shown in FIG. 7.

FIG. 10 is a flowchart illustrating the operation of command reception unit 52 of printer 14a shown in FIG. 7. The operation of command reception unit 52 will be described with reference to the flowchart shown in FIG. 10. The program shown in this flowchart is stored in the ROM, and the CPU controls the following operation based on the program.

In step S91, the CPU determines if a command from transmission/reception block 13a has been received within the RAM. If the result of the determination is affirmative, the proceeds to steps S92, and further to S93. If the result of the determination is negative, the process returns to the initial state.

In step S93, the CPU determines if the received command is a power supply control command. If the result of the determination is negative, the process proceeds to step S94. If the result of the determination is affirmative, the process proceeds to step S95.

In step S95, the CPU determines if the received command is a command to turn on the power supply of printer 14a. If the result of the determination is affirmative, the process proceeds to step S96, in which signal 50 is made to be an "on" signal to switch on switch 49, whereby main power supply unit 48 is turned on to supply electric power to block 40a, so that printer 14a can transmit and receive data. If the result of the determination in step S95 is negative, the process proceeds to step S97, in which the CPU determines if the received command is a command to turn off the power supply of printer 14a. If the result of the determination is affirmative, the process proceeds to step S98, in which signal 50 is made to be an "off" signal to switch off switch 49, whereby main power supply unit 48 is turned off. If the result of the determination in step S97 is negative, the process returns to step S91.

After the processing of step S94, S96 or S98 has been completed, the process returns to step S59, and the above-described processing is repeated.

Accordingly, the power supply of printer 14a is subjected to on/off control in accordance with a command input from transmission/reception block 13a. Since electric power supply to command reception unit 52 of printer 14a is maintained, the power supply control request input via transmission/reception block 13a is achieved.

Figure 11:
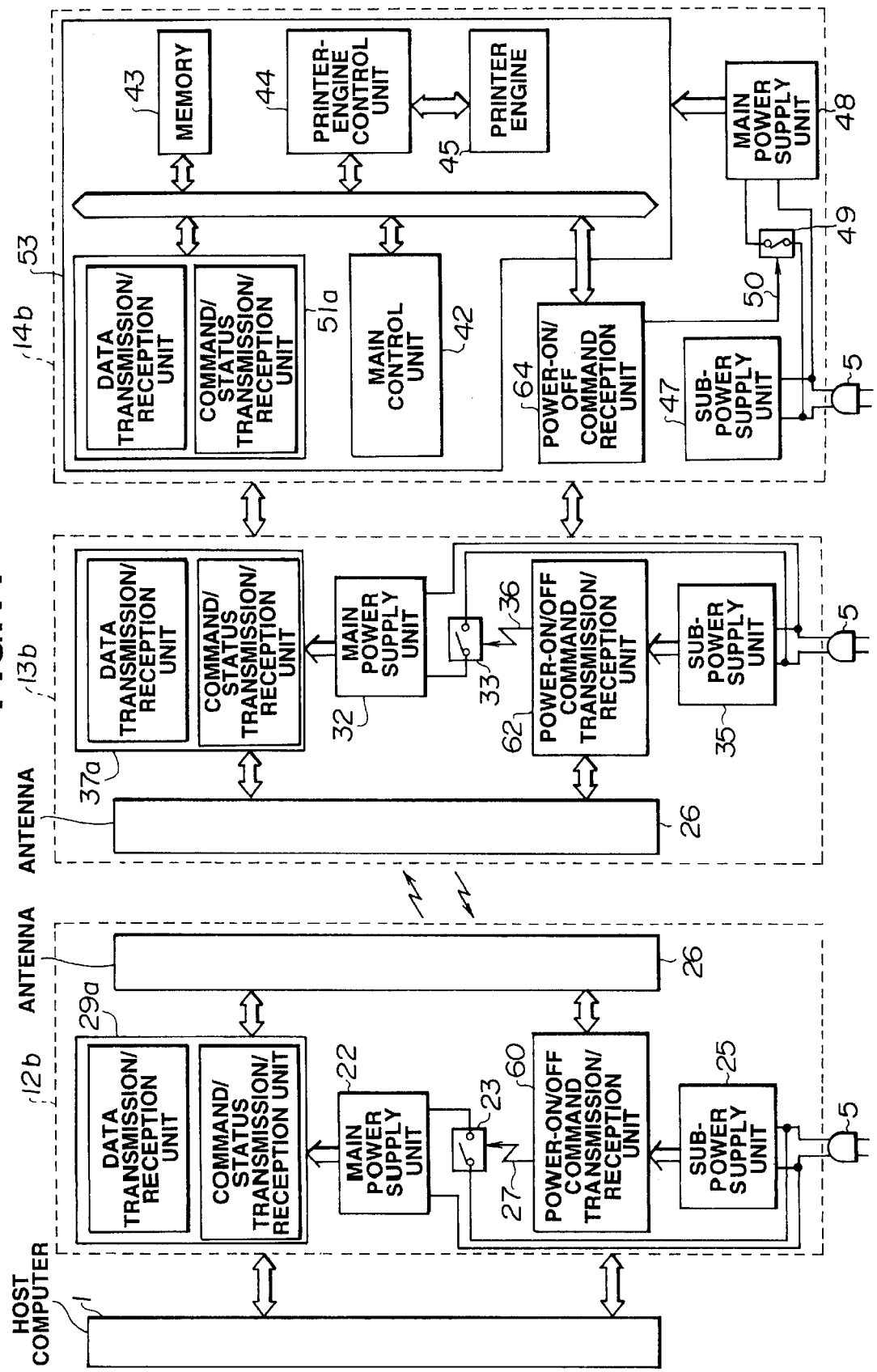
FIG. 11 is a block diagram illustrating a schematic configuration of a printing system according to still another embodiment of the present invention.

FIG. 11 is a block diagram illustrating a schematic configuration of a printing system according to still another embodiment of the present invention. In FIG. 11, the same units as those shown in FIG. 7 are indicated by the same reference numerals, and an explanation thereof will be omitted.

In this embodiment, the transmission/reception unit of each of transmission/reception blocks 12b and 13b and printer 14b is divided into a data transmission/reception unit, a command/status transmission/reception unit, and a power on/off command transmission/reception unit. The power supplies of transmission/reception blocks 12b and 13b and printer 14b are subjected to on/off control based on a power-supply-on/off command from host computer 1 received via power-on/off command transmission/reception units 60, 62 and 64, respectively.

Figure 12:
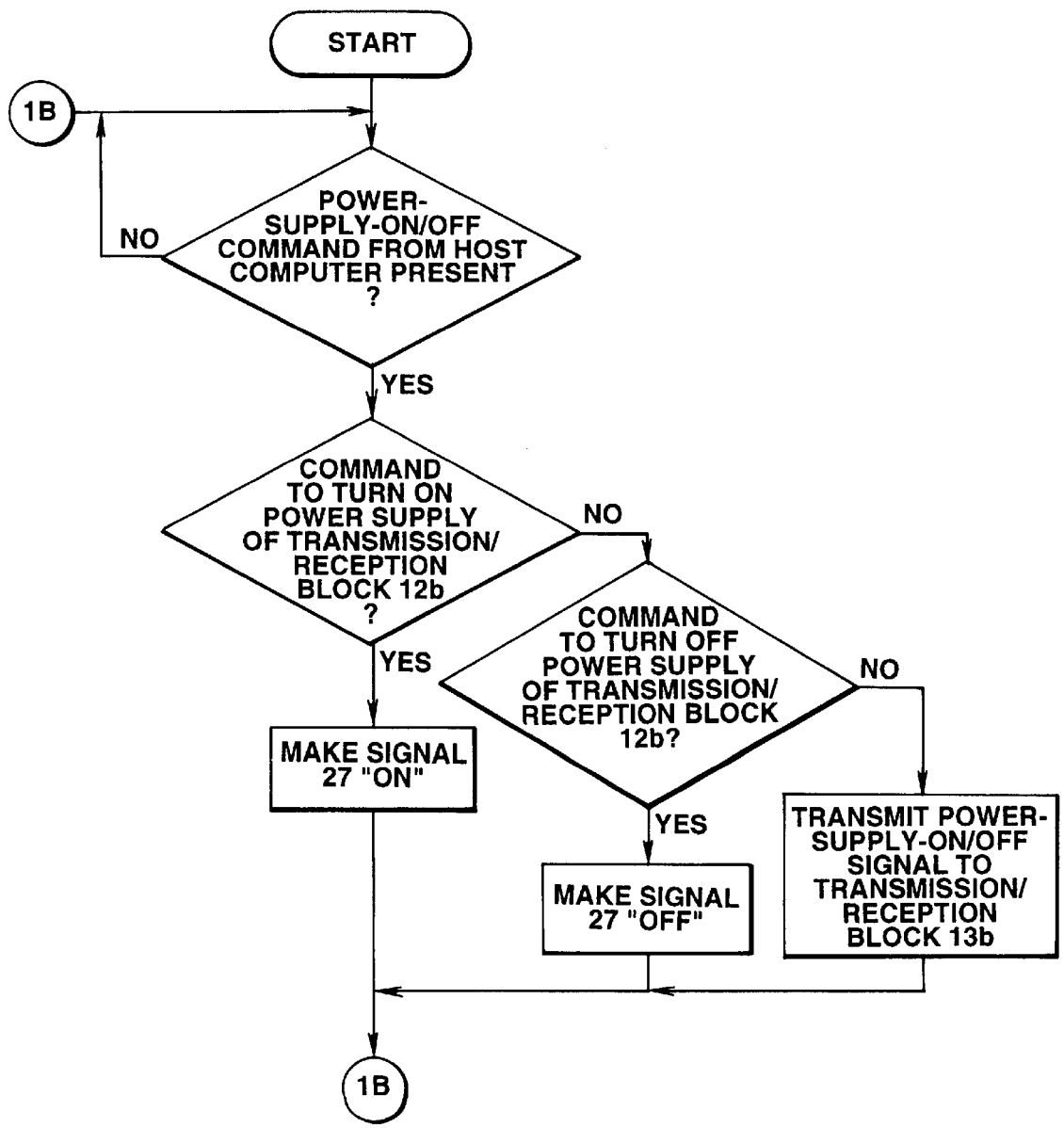
FIG. 12 is a flowchart illustrating the operation of power-on/off command transmission/reception unit 60 of transmission/reception block 12b shown in FIG. 11.

In FIG. 11, data from host computer 1 is transmitted to printer 14b via respective data and command/status transmission/reception units 29a, 37a and 51a of transmission/reception blocks 12b and 13b and printer 14b, and the transmitted data is subjected to printing. When a power-supply-on/off command from host computer 1 has been received by power-on/off command transmission/reception unit 60, power supply switch 23 is switched on or off by signal 27 in accordance with the contents of the command, and the power-supply-on/off command is transmitted to transmission/reception block 13b via antenna 26-1 and 26-2. This command is received by power-on/off command transmission/reception unit 62, and the power supply of transmission/reception block 13b is turned on or off by controlling power supply switch 33 by signal 36. The command is further transmitted from power-on/off command transmission/reception unit 62 to power-on/off command reception unit 64 of printer 14b, whereby the power supply of printer 14b is subjected to on/off control;

FIG. 12 is a flowchart illustrating the operation of power-on/off command transmission/reception unit 60 of transmission/reception block 12b shown in FIG. 11. The operation of power-on/off command transmission/reception unit 60 will be described with reference to the flowchart shown in FIG. 12. The program shown in the flowchart of FIG. 12 is stored in the ROM. The CPU controls the following operation based on this program.

First, in step S101, the CPU determines if a power-supply-on/off command from host computer 1 has been received within the RAM. If the result of the determination is affirmative, the process proceeds to step S102. If the result of the determination in step S101 is negative, the process returns to the initial state.

In step S102, the CPU determines if the received command is a command to turn on the power supply of transmission/reception block 12b. If the result of the determination is affirmative, the process proceeds to step S103, in which signal 27 is made to be an "on" signal to switch on switch 23, whereby main power supply 22 is turned on to supply electric power to data/command/status transmission/reception unit 29a, so that data can be transmitted to and received from host computer 1 and transmission/reception block 13b. If the result of the determination in step S102 is negative, the process proceeds to step S104, in which the CPU determines if the received command is a command to turn off the power supply of transmission/reception block 12b. If the result of the determination is affirmative, the process proceeds to step S105, in which signal 27 is made to be an "off" signal to switch off switch 23, whereby main power supply unit 22 is turned off.

If the result of the determination in step S104 is negative, that is, if the received command is a power-supply-on/off command for transmission/reception block 13b or printer 14b, the process proceeds to step S106, in which the power-supply-on/off command for transmission/reception block 13b or printer 14b is transmitted to transmission/reception block 13b.

After the processing of step S103, S105 or S106 has been completed, the process returns to step S101, and the above-described processing is repeated.

Accordingly, the power supply of transmission reception block 12b is subjected to on/off control in accordance with a command input from host computer 1. The power supplies of transmission/reception block 13b and printer 14b are also subjected to on/off control in accordance with the command input from host computer 1. Since electric power supply to power-on/off command reception unit 64 of printer 14b is maintained, the power supply control request from host computer 1 is achieved.

Figure 13:
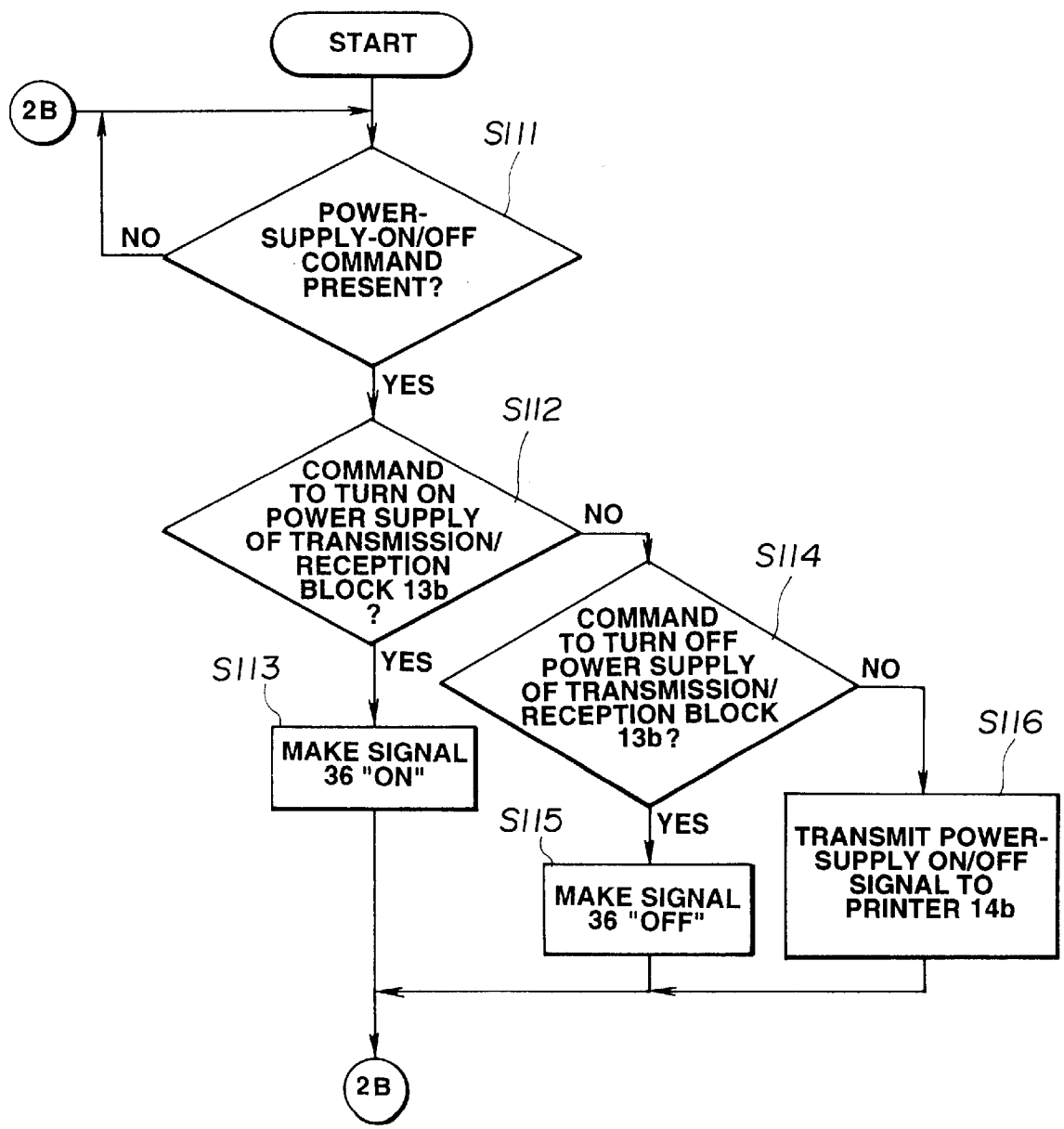
FIG. 13 is a flowchart illustrating the operation of power-on/off command transmission/reception unit 62 of transmission/reception block 13b shown in FIG. 11.

FIG. 13 is a flowchart illustrating the operation of power-on/off command transmission/reception unit 62 of transmission/reception block 13b shown in FIG. 11. The operation of power-of/off command transmission/reception unit 62 will be described with reference to the flowchart shown in FIG. 13.

In step S111, the CPU determines if a command from transmission/reception block 12b has been received. If the result of the determination is affirmative, the process proceeds to steps S112. If the result of the determination is negative, the process returns to the initial state.

In step S112, the CPU determines if the received command is a command to turn on the power supply of transmission/reception block 13b. If the result of the determination is affirmative, the process proceeds to step S113, in which signal 36 is made to be an "on" signal to switch on switch 33, whereby main power supply unit 32 is turned on to supply electric power to data/command/status transmission/reception unit 37a, so that data can be transmitted to and received from transmission/reception block 12b and printer 14b. If the result of the determination in step S112 is negative, the process proceeds to step S114, in which the CPU determines if the received command is a command to turn off the power supply of transmission/reception block 13b. If the result of the determination is affirmative, the process proceeds to step S115, in which signal 36 is made to be an "off" signal to switch off switch 33, whereby main power supply unit 32 is turned off.

If the result of the determination in step S114 is negative, that is, if the received command is a power-supply-on/off command for printer 14b, the process proceeds to step S116, in which the power-supply-on/off command for printer 14b is transmitted to printer 14b.

After the processing of step S113, S115 or S116 has been completed, the process returns to step S111, and the above-described processing is repeated.

Accordingly, the power supply of transmission/reception block 13b is subjected to on/off control in accordance with a command input from transmission/reception block 12b. The power supply of printer 14b is also subjected to on/off control in accordance with the command input from transmission/reception block 12b. Since electric power supply to power-on/off command reception unit 64 of printer 14b is maintained, the power supply control request input via transmission/reception block 12b is achieved.

Figure 14:
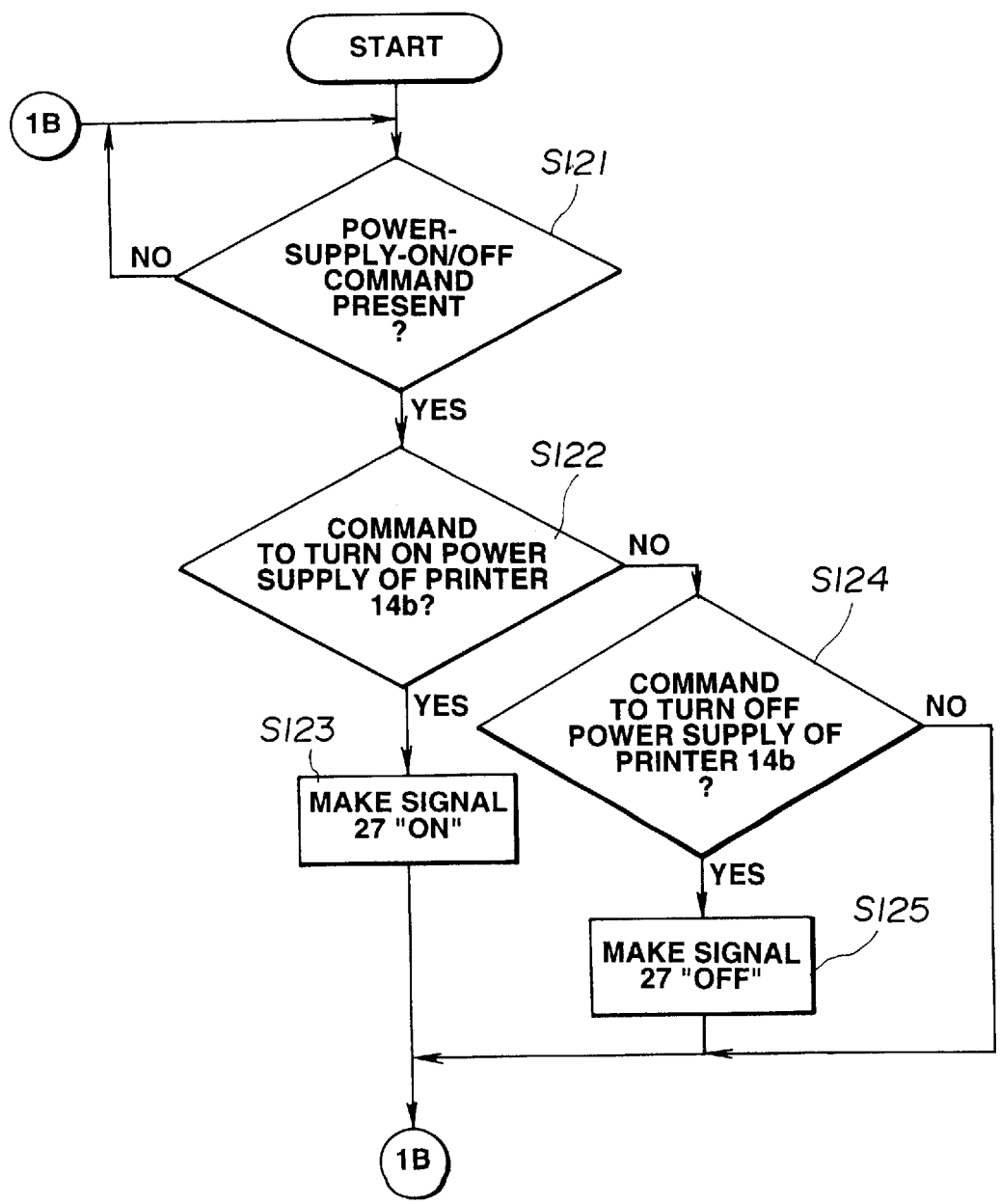
FIG. 14 is a flowchart illustrating the operation of power-on/off command reception unit 64 of printer 14b shown in FIG. 11.

FIG. 14 is a flowchart illustrating the operation of power-on/off command reception unit 64 of printer 14b shown in FIG. 11. The operation of power-on/off command reception unit 64 will be described with reference to the flowchart shown in FIG. 14. The program shown in this flowchart is stored in the ROM, and the CPU controls the following operation based on the program.

In step S121, the CPU determines if a command from transmission/reception block 13b has been received within the RAM. If the result of the determination is affirmative, the process proceeds to steps S122. If the result of the determination is negative, the process returns to the initial state.

In step S122, the CPU determines if the received command is a command to turn on the power supply of printer 14b. If the result of the determination is affirmative, the process proceeds to step S123, in which signal 50 is made to be an "on" signal to switch on switch 49, whereby main power supply unit 48 is turned on to supply electric power to block 53, so that printer 14b can transmit and receive data. If the result of the determination in step S122 is negative, the process proceeds to step S124, in which the CPU determines if the received command is a command to turn off the power supply of printer 14b. If the result of the determination is affirmative, the process proceeds to step S125, in which signal 50 is made to be an "off" signal to switch off switch 49, whereby main power supply unit 48 is turned off. If the result of the determination in step S124 is negative, the process returns to step S121.

After the processing of step S123 or S125 has been completed, the process returns to step S121, and the above-described processing is repeated.

Accordingly, the power supply of printer 14b is subjected to on/off control in accordance with a command input from transmission/reception block 13b. Since electric power supply to power-on/off command reception unit 64 of printer 14b is maintained, the power supply control request input via transmission/reception block 13b is achieved.

Figure 15:
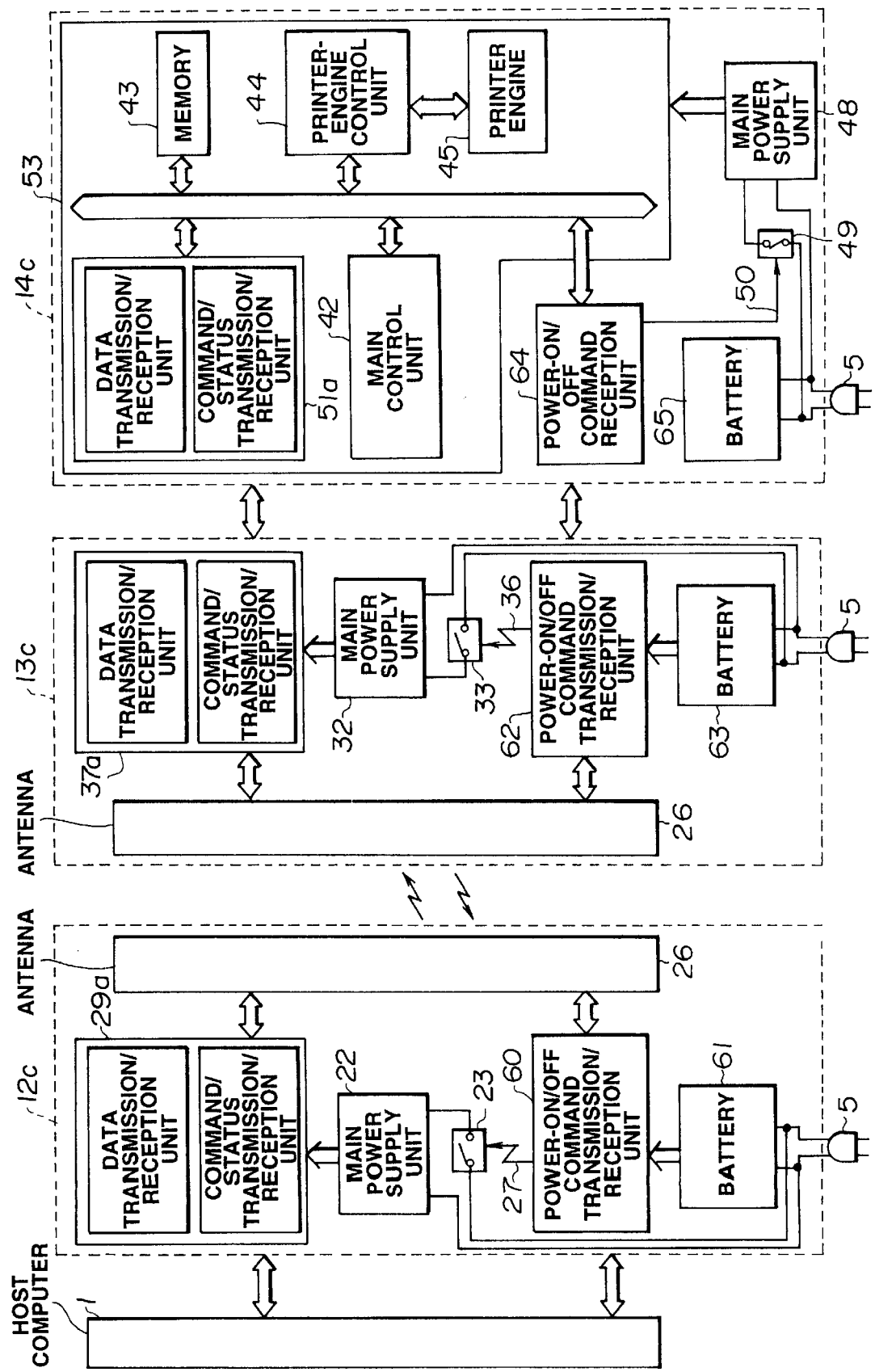
FIG. 15 is a block diagram illustrating a schematic configuration of a printing system according to still another embodiment of the present invention.

FIG. 15 is a block diagram illustrating a schematic configuration of a printing system according to still another embodiment of the present invention. In FIG. 15, the same units as those shown in FIG. 11 are indicated by the same reference numerals, and an explanation thereof will be omitted.

In this embodiment, the respective sub-power supply units 25, 35 and 47 of transmission/reception blocks 12b and 13b and printer 14b are replaced by batteries 61, 63 and 65, respectively.

In the printers 4, 14a and 14b of the foregoing embodiments and printer 14c of the present embodiment, printing may be performed by any recording method. For example, these embodiments may, of course, be applied to any of laser-beam printers, thermal transfer printers, ink-jet printers and the like.

Next, a description will be provided of a system, in which a wire network system and a radio network system are mixed, according to still another embodiment of the present invention.

Figure 17:
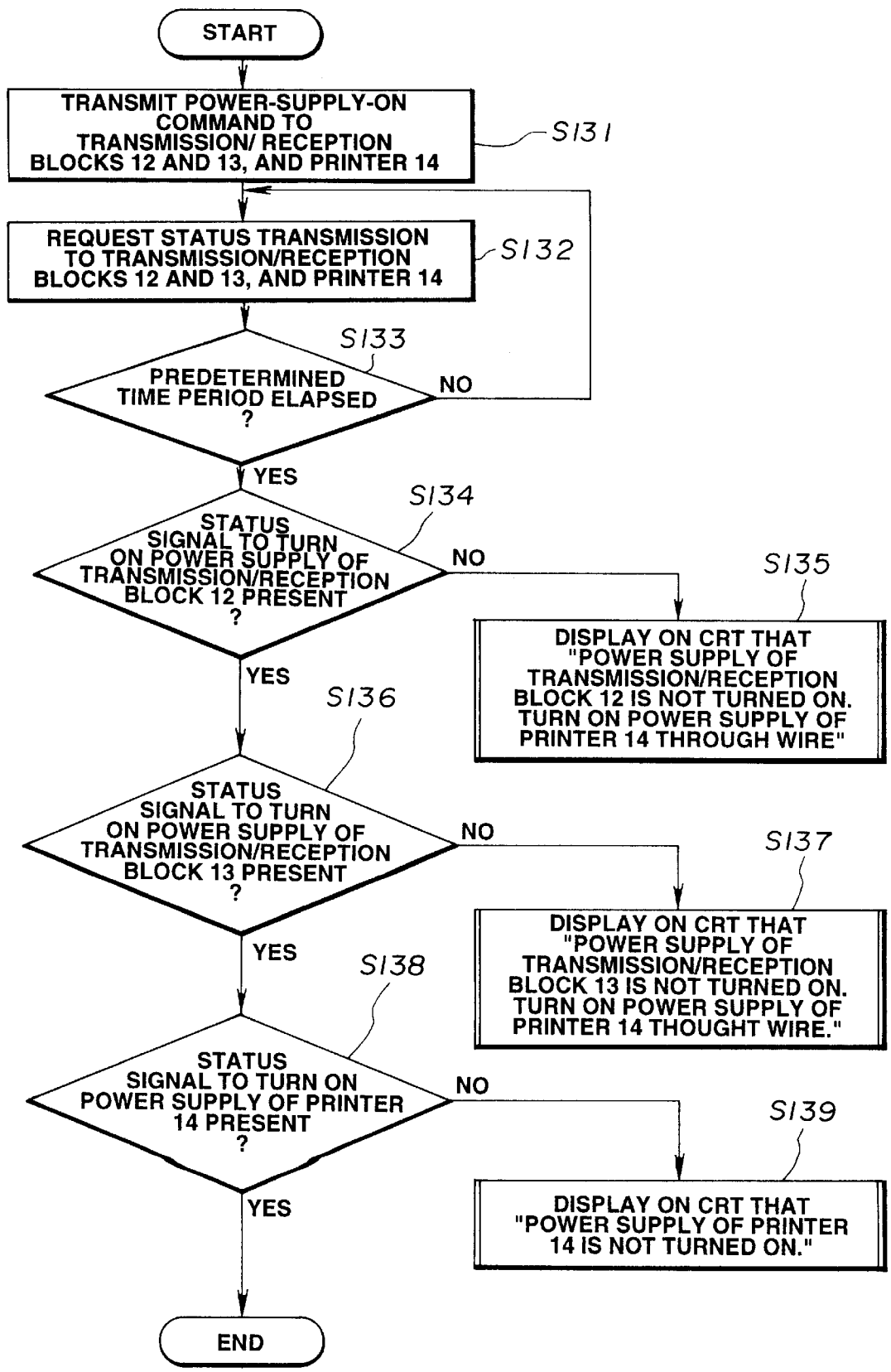
FIG. 17 is a flowchart illustrating the operation of host computer 1 or 1' to be shown in FIG. 24.
Figure 24:
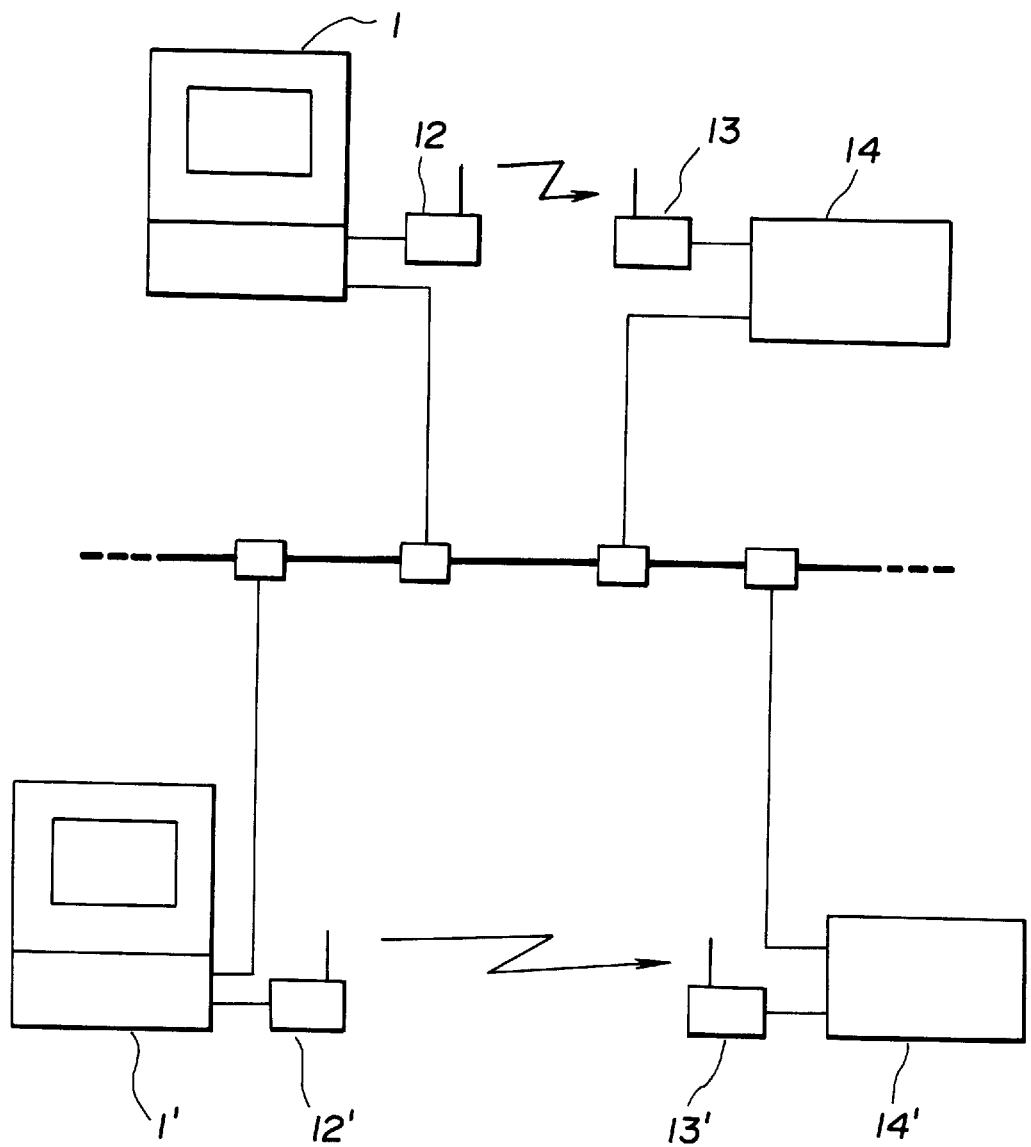
FIG. 24 is a diagram illustrating a system in which a host computer and a printer are connected by a wire system and a radio system.

FIG. 17 is a flowchart of this embodiment illustrating the operation performed when, as shown in FIG. 24, host computer 1 causes the power supply of printer 14 to be started via radio transceivers 12 and 13 in a system in which a wire network system (a system using interface cables) and a radio network system (a system using radio information transceivers) are mixed. The entire procedure shown in FIG. 17 is controlled by the CPU within host computer 1 shown in FIG. 16. The program of the procedure is incorporated in the ROM within host computer 1. The operation of this embodiment will be described with reference to FIG. 17.

First, in step S131, a command to start respective power supplies is transmitted from host computer 1 to transmission/reception blocks 12 and 13 and printer 14. Thereafter, in step S132, host computer 1 requests transmission blocks 12 and 13 and printer 14 to transmit respective status signals, and the process proceeds to step S133. If a predetermined time period has elapsed in step S133, the process proceeds to step S134. If the predetermined time period has not elapsed in step S133, the process returns to step S132. In step S134, the CPU checks if a status signal to turn on the power supply has returned from transmission/reception block 12. If the result of the check is affirmative, the process proceeds to step S136. If the result of the check is negative, the process proceeds to step S135. In step S135, since the power supply of transmission/reception block 12 is not turned on, a display "The power supply of the transceiver is not turned on. Turn on the power supply of the printer through wire." or the like is performed on a CRT.

In step S136, the CPU checks if a status signal to turn on the power supply has returned from transmission/reception block 13. If the result of the check is affirmative, the process proceeds to step S138. If the result of the check is negative, the process proceeds to step S137, in which a display "The power supply of the transceiver is not turned on. Turn on the power supply of the printer through wire." or the like is performed on the CRT. Reference numeral 2001 shown in FIG. 18 represents the contents of the display.

Similarly, in step S138, the CPU checks if a status signal to turn on the power supply has returned from printer 14. If the result of the check is affirmative, the process is terminated. If the result of the check is negative, the process proceeds to step S139, in which a display "The power supply of the printer is not turned on." is performed on the CRT. Reference numeral 2002 shown in FIG. 18 represents the contents of the display.

Accordingly, when a display to request to turn on the power supply of each unit through wire is performed on the CRT of host computer 1, it indicates that some kind of trouble which does not permit transmission of a radio signal has occurred. In such a case, the user switches the system from the radio system to the wire system, and transmits a power-supply-on command. In the above-described display operation, a command may be transmitted while automatically switching the system from the radio system to the wire system, and a display indicating that the command is being transmitted may be performed on the CRT.

Figure 19:
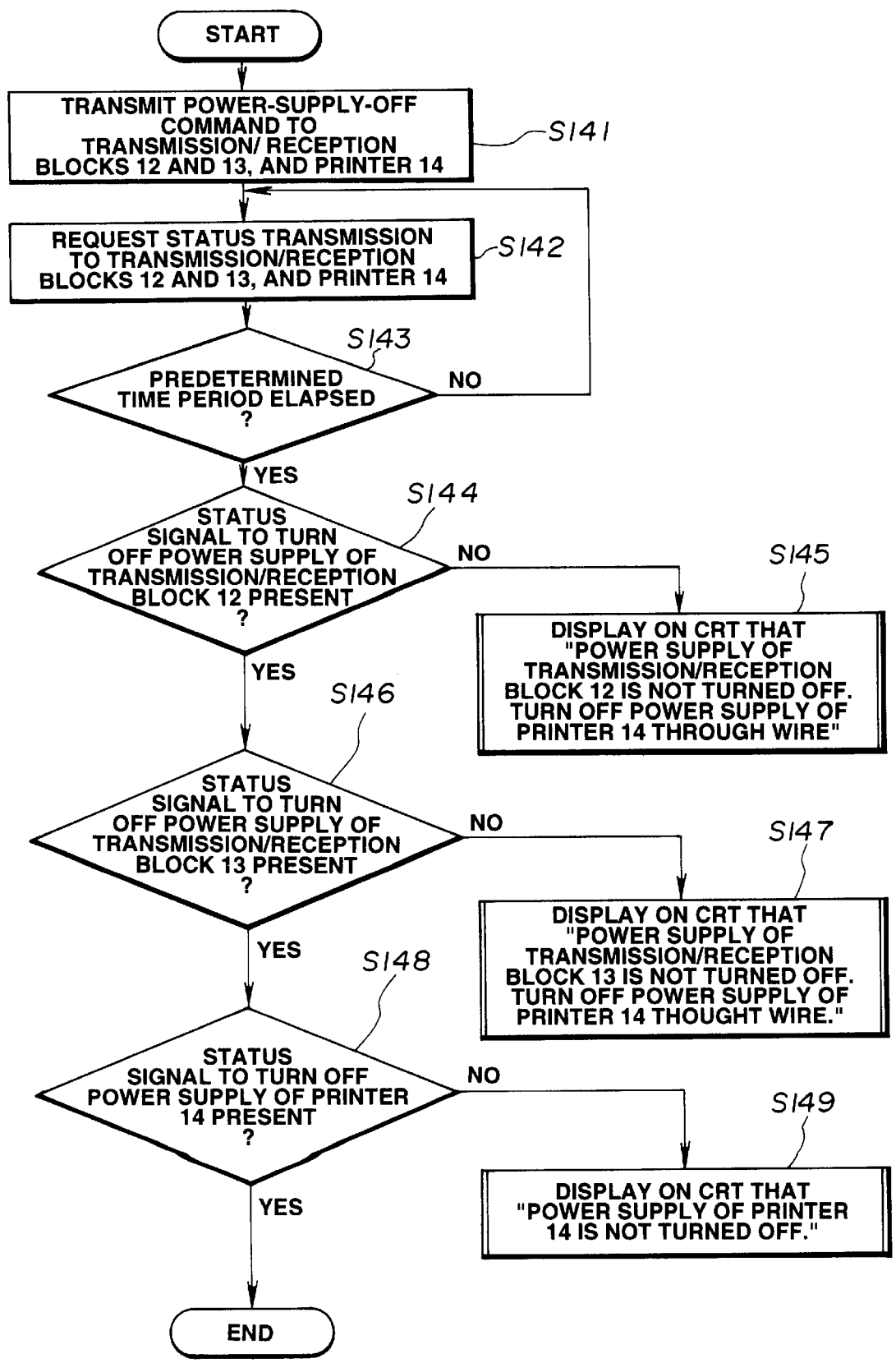
FIG. 19 is a flowchart illustrating the operation of host computer 1 or 1' shown in FIG. 24.

FIG. 19 is a flowchart illustrating the operation of still another embodiment of the present invention. As in the above-described embodiment, FIG. 19 illustrates the flow performed when host computer 1 causes the power supply of printer 14 to be turned off via radio transceivers 12 and 13 in the system shown in FIG. 24. As in the above-described embodiment, the procedure shown in FIG. 19 is controlled by the CPU within host computer 1 shown in FIG. 16. The program of the procedure is incorporated in the ROM within host computer 1. The operation of this embodiment will be described with reference to FIG. 19.

First, in step S141, a command to turn off respective power supplies is transmitted from host computer 1 to transmission/reception blocks 12 and 13 and printer 14. Thereafter, in step S142, host computer 1 requests transmission blocks 12 and 13 and printer 14 to transmit respective status signals, and the process proceeds to step S143. If a predetermined time period has elapsed in step S143, the process proceeds to step S144. If the predetermined time period has not elapsed in step S143, the process returns to step S142. In step S144, the CPU checks if a status signal to turn off the power supply has returned from transmission/reception block 12. If the result of the check is affirmative, the process proceeds to step S146. If the result of the check is negative, the process proceeds to step S145. In step S145, since the power supply of transmission/reception block 12 is not turned off, a display "The power supply of the transceiver is not turned off. Turn off the power switch of the printer through wire." or the like is performed on the CRT.

Figure 20:
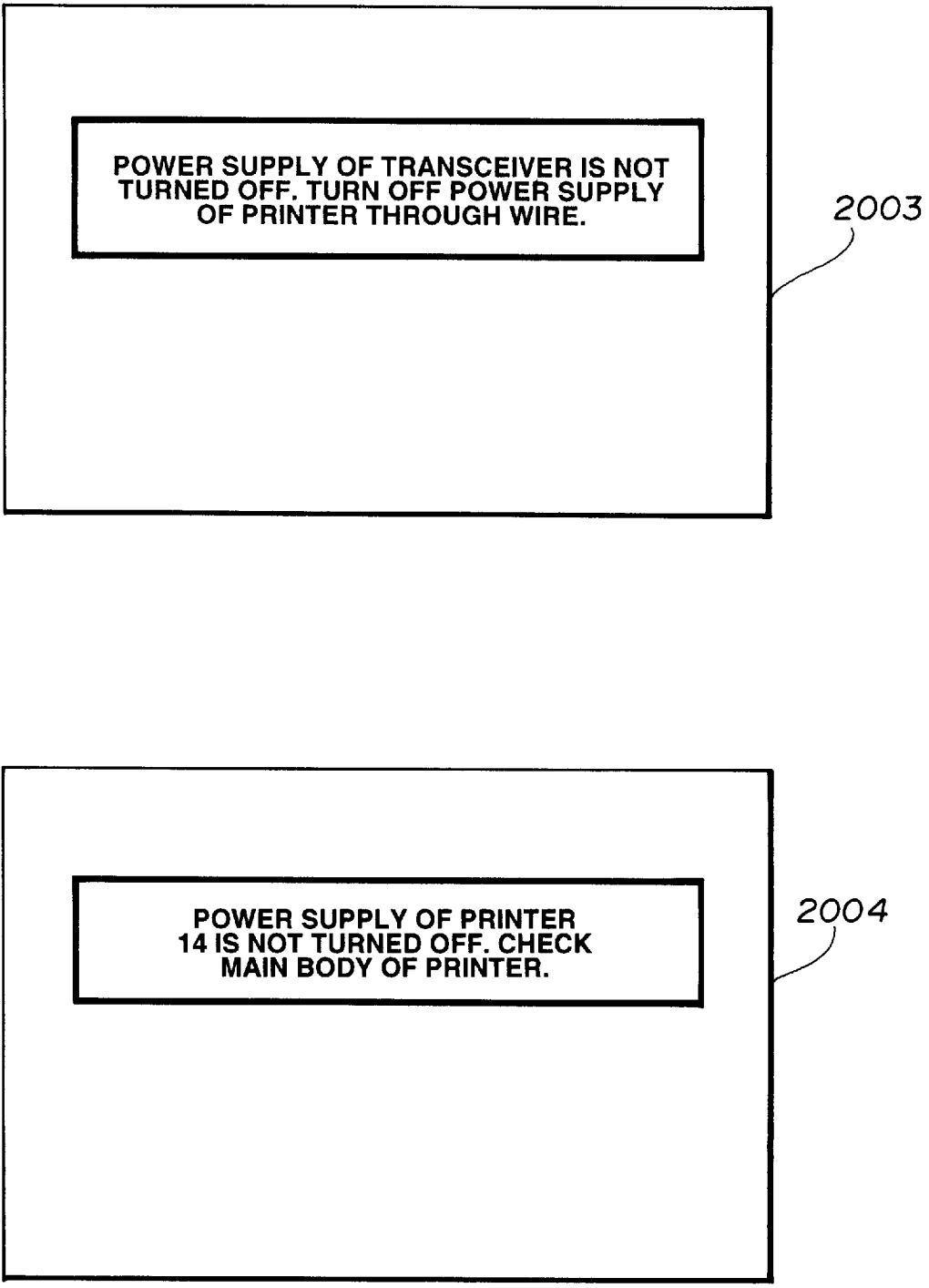
FIG. 20 illustrates contents displayed on the CRT of the host computer.

In step S146, the CPU checks if a status signal to turn off the power supply has returned from transmission/reception block 13. If the result of the check is affirmative, the process proceeds to step S148. If the result of the check is negative, the process proceeds to step S147, in which a display "The power supply of the transceiver is not turned off. Turn off the power supply of the printer through wire." or the like is performed on the CRT. Reference numeral 2003 shown in FIG. 20 represents the contents of the display.

Similarly, in step S148, the CPU checks if a status signal to turn off the power supply has returned from printer 14. If the result of the check is affirmative, the process is terminated. If the result of the check is negative, the process proceeds to step S149, in which the CRT displays "The power supply of the printer is not turned off." or the like. Reference numeral 2004 shown in FIG. 20 represents the contents of the display.

Accordingly, when a display to request to turn off the power supply of each unit through wire is performed on the CRT of host computer 1, it indicates that some kind of trouble which does not permit transmission of a radio signal has occurred. In such a case, the user switches the system from the radio system to the wire system, and transmits a power-supply-off command. In the above-described display operation, a command may be transmitted while automatically switching the system from the radio system to the wire system, and a display indicating that the command is being transmitted may be performed on the CRT.

Figure 21:
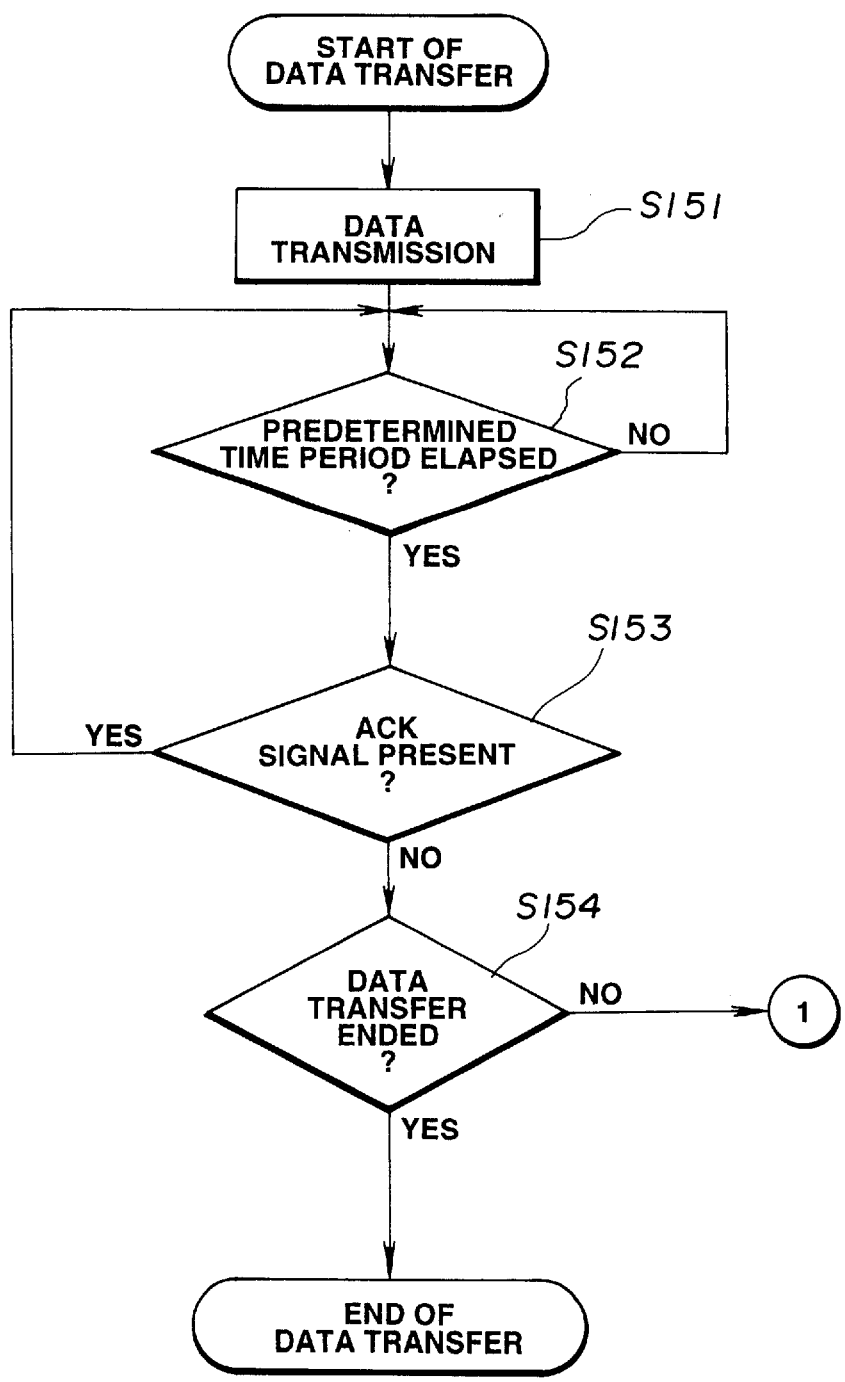
FIG. 21 is a flowchart illustrating the operation of host computer 1 or 1' shown in FIG. 24.
Figure 22:
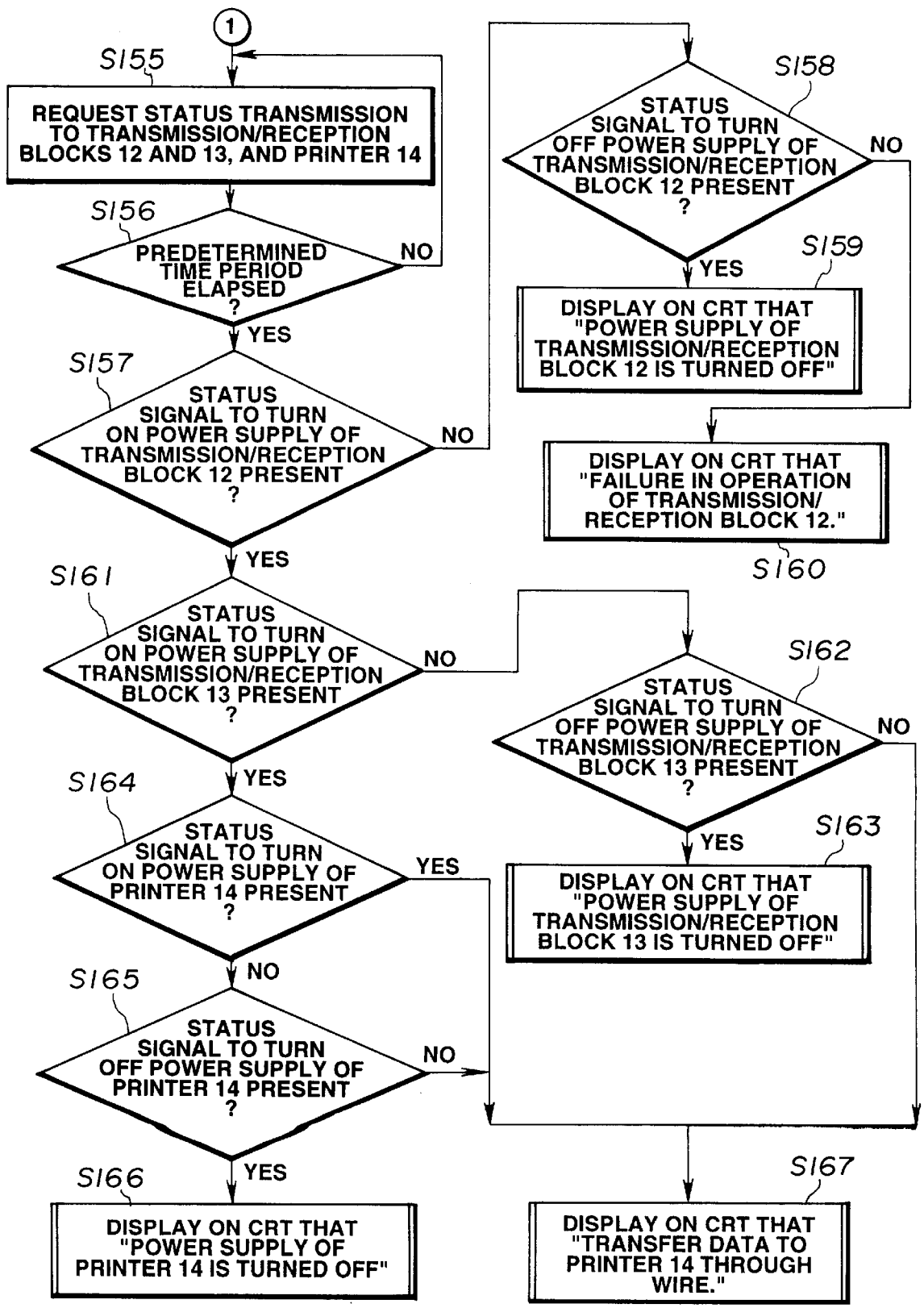
FIG. 22 is a flowchart illustrating the operation of host computer 1 or 1' shown in FIG. 24.

FIGS. 21 and 22 are flowcharts illustrating the operation of still another embodiment of the present invention, and illustrate the processing performed when data cannot favorably be transferred when transmitting the data from host computer 1 to printer 14 via radio transceivers 12 and 13 in the system shown in FIG. 24. The entire procedure shown in FIGS. 21 and 22 is controlled by the CPU within host computer 1. The program of the procedure is incorporated in the ROM within host computer 1. The operation of this embodiment will be described with reference to the flowcharts shown in FIGS. 21 and 22.

First, in step S151, host computer 1 starts to transmit data to printer 14, and the process proceeds to step S152. Step S152 is repeated until a predetermined time period elapses. When the predetermined time period has elapsed, the process proceeds to step S153. In step S153, the CPU checks if an ACK signal has returned from printer 14 to host computer 1. If the result of the check is affirmative, the process returns to step S152, in which after the lapse of the predetermined time period the CPU checks again if an ACK signal has returned. If the result of the check in step S153 is negative, the process proceeds to step S154, in which the CPU checks if the data transfer to printer 14 has been completed.

If the result of the check in step S154 is affirmative, the data transfer is terminated. If the result of the check in step S154 is negative, the process proceeds to step S155, in which the CPU requests transmission/reception blocks 12 and 13 and printer 14 to transmit respective status signals. The process then proceeds to step S156, in which the CPU checks if a predetermined time period has elapsed. If the result of the check is affirmative, the process proceeds to step S157. If the result of the check is negative, the process returns to step S155.

Figure 23:
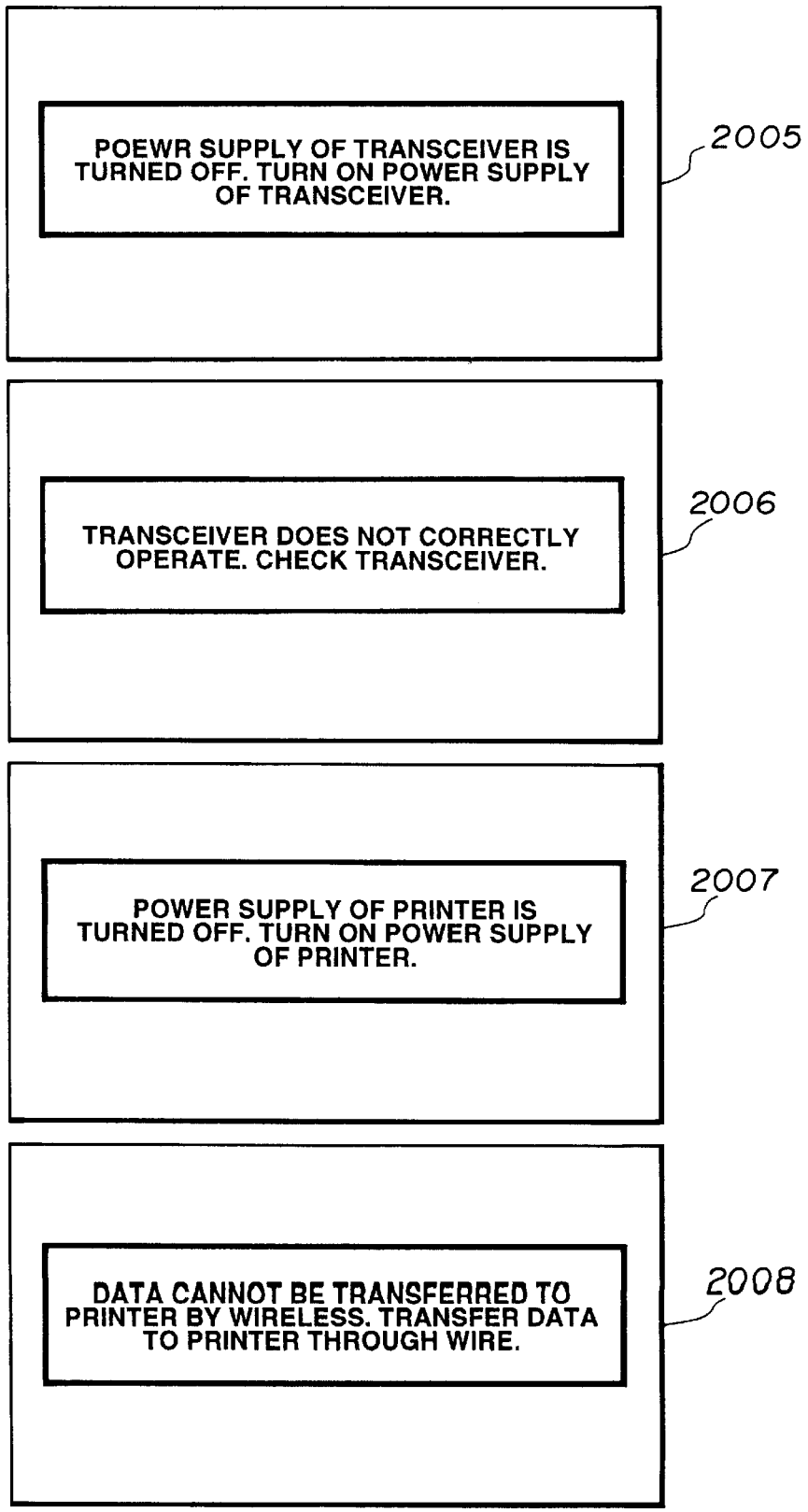
FIG. 23 illustrates contents displayed on the CRT of the host computer.

In step S157, the CPU checks if a status signal to turn on the power supply has returned from transmission/reception block 12. If the result of the check is affirmative, the process proceeds to step S161. If the result of the check is negative, the process proceeds to step S158, in which the CPU checks if a status signal to turn off the power supply has returned from transmission/reception block 12. If the result of the check is affirmative, the process proceeds to step S159, in which a display "The power supply of the transceiver is turned off." or the like is performed on the CRT of host computer 1. Reference numeral 2005 shown in FIG. 23 represents the contents of the display. If the result of the check in step S158 is negative, it indicates that transmission/reception block 12 does not operate correctly. In such a case, the process proceeds to step S160, in which a display "The transceiver does not operate correctly." is performed on the CRT. Reference numeral 2006 shown in FIG. 23 represents the contents of the display.

In step S161, the CPU checks if a status signal to turn on the power supply has returned from transmission/reception block 13. If the result of the check is affirmative, the process proceeds to step S164. If the result of the check is negative, the process proceeds to step S162, in which the CPU checks if a status signal to turn off the power supply has returned from transmission/reception block 13. If the result of the check is affirmative, the process proceeds to step S163, in which a display "The power supply of the transceiver is turned off." or the like is performed on the CRT. If the result of the check in step S162 is negative, the process proceeds to step S167, in which a display "Data cannot be transferred to the printer by wireless transmission." or the like is performed on the CRT, since communication cannot be performed with transmission/reception block 13. Reference numeral 2008 shown in FIG. 23 represents the contents of the display.

In step S164, the CPU checks if a status signal to turn on the power supply has returned from printer 14. If the result of the check is affirmative, the process proceeds to step S167. If the result of the check is negative, the process proceeds to step S165, in which the CPU checks if a status signal to turn off the power supply has returned from printer 14. If the result of the check is negative, the process proceeds to step S167. If the result of the check is affirmative, the process proceeds to step S166, in which a display "The power supply of the printer is turned off." or the like is performed on the CRT. Reference numeral 2007 shown in FIG. 23 represents the contents of the display.

In the above-described embodiment, information, comprising commands and the like, is output to the printer while switching the system from the radio system to the wire system. However, information may be output while switching the system from the wired system to the radio system.

Figure 25:
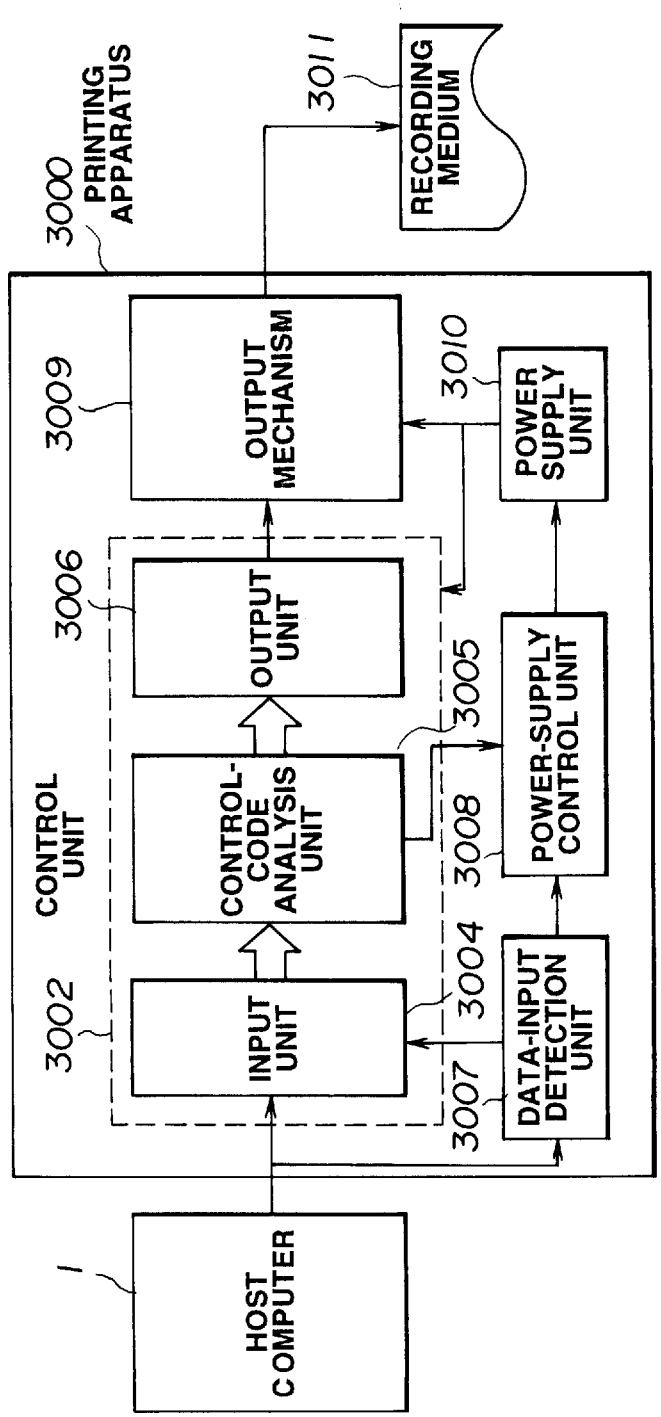
FIG. 25 is a block diagram illustrating a configuration of control in a printing system according to still another embodiment of the present invention.

FIG. 25 is a block diagram illustrating the configuration of control of an apparatus according to still another embodiment of the present invention.

In FIG. 25, reference numeral 3000 represents a printing apparatus. Control unit 3002 is configured by a CPU, a ROM, a RAM and the like (not shown), and includes an input unit 3004 for receiving input data, such as control codes and the like, from an external apparatus (for example, host computer 1), a control-code analysis unit 3005 for analyzing control codes and the like in the received input data, output unit 3006 for generating an image signal to be output to output mechanism 3009 based on a control code output from control-code analysis unit 3005, and the like. Data-input detection unit 3007 detects data input from host computer 1, and transmits a command to power-supply control unit 3008 to supply control unit 3002 and output mechanism 3009 with current Power supply unit 3010 supplies control unit 3002 and output mechanism 3009 with electric power having a predetermined potential. Output mechanism 3009 prints a document or an image on recording medium 3011 based on printing information (for example, a laser-on/off signal when using a laser-beam printer engine) from output unit 3006. Electric power supply is maintained for data-input detection unit 3007 and power-supply control unit 3008 from a power supply unit (not shown) which is different from power supply unit 3010.

A description will now be provided of the configuration and the operation of each unit.

Data transferred from host computer 1 is first stored in input unit 3004, comprising a RAM and the like (not shown), and is then transmitted to control-code analysis unit 3005. When control-code analysis unit 3005 analyzes that the input data comprises a control code corresponding to power supply control, it transmits to power-supply control unit 3008 a command to turn off electric power supply for at least one of control unit 3002 and output mechanism 3009 of printing apparatus 3000. Power-supply control unit 3008 interrupts current supply from power supply unit 3010 to at least one of control unit 3002 and output mechanism 3009 based on the command received from control-code analysis unit 3005. In the case of another control code, control-code analysis unit 3005 transmits a processing command relating to an output operation to output unit 3006. Output unit 3006 performs, for example, on/off control of a laser beam for output mechanism 3009, whereby a printing result is recorded on recording medium 3011, such as paper or the like.

In the printing apparatus having the above-described configuration, control-code analysis unit 3005 analyzes an input code from host computer 1, and power-supply control unit 3008 interrupts electric power supply from power supply unit 3010 to at least one of control unit 3002 and output mechanism 3009 according to the operation program (stored in a ROM (not shown)) shown in the flowchart of FIG. 26 (to be described later). Hence, it is possible to securely interrupt electric power supply to at least one of control unit 3002 and output mechanism 3009 of printing apparatus 3000 by a command from host computer 1.

In still another embodiment of the present invention, data-input detection unit 3007 monitors a data input state for a predetermined time period, and outputs a power-supply control command for interrupting electric power supply from power supply unit 3010 to at least one of control unit 3002 and output mechanism 3009 to power-supply control unit 3008. Power-supply control unit 3008 thereby interrupts electric power supply from power supply unit 3010 to at least one of control unit 3002 and output mechanism 3009 according to the flowchart shown in FIG. 27 (to be described later). Hence, it is possible to securely interrupt electric power supply to output mechanism 3009 or control unit 3002 having a large loss in electric power even if a printing waiting state is provided for a long time period after printing processing has been performed, and to reduce electric power consumption in the entire printing apparatus.

In still another embodiment of the present invention, data-input detection unit 3007 detects a data input from host computer 1 while electric power supply to control unit 3002 is interrupted, and outputs a power-supply control command for starting electric power supply from power supply unit 3010 to at least one of control unit 3002 and output mechanism 3009. Power-supply control unit 3008 thereby starts electric power supply from power supply unit 3010 to at least one of control unit 3002 and output mechanism 3009 according to the flowchart shown in FIG. 28 (to be described later). Hence, it is possible securely start electric power supply to control unit 3002 or output mechanism 3009 of printing apparatus 3000 only by outputting data from host computer 1 to printing apparatus 3000, and to reduce electric power consumption in the entire printing apparatus.

In the above-described flow of processing, when data has not been transmitted from host computer 1 to input unit 3004 for at least a predetermined time period, control-code analysis unit 3005 terminates analysis and transmits a command to interrupt electric power supply to at least one of control unit 3002 and output mechanism 3009 of printing apparatus 3000 to power-supply control unit 3008. Power-supply control unit 3008 interrupts electric power supply from power supply unit 3010 to at least one of control unit 3002 and output mechanism 3009 based on the command received from control-code analysis unit 3005.

When data has been transmitted from host computer 1 while electric power supply to control unit 3002 of printing apparatus 3000 has been interrupted, data-input detection unit 3007 detects the data input and transmits a command to supply electric power to at least one of control unit 3002 and output mechanism 3009 to power-supply control unit 3008, and instructs control unit 3002 to start a data input operation. Power-supply control unit 3008 causes electric power supply from power supply unit 3010 to at least one of control unit 3002 and output mechanism 3009 based on the command received from data-input detection unit 3007. A description will now be provided of a power-supply control procedure in the printing apparatus of the present invention with reference to the flowcharts shown in FIGS. 26 through 28.

Figure 26:
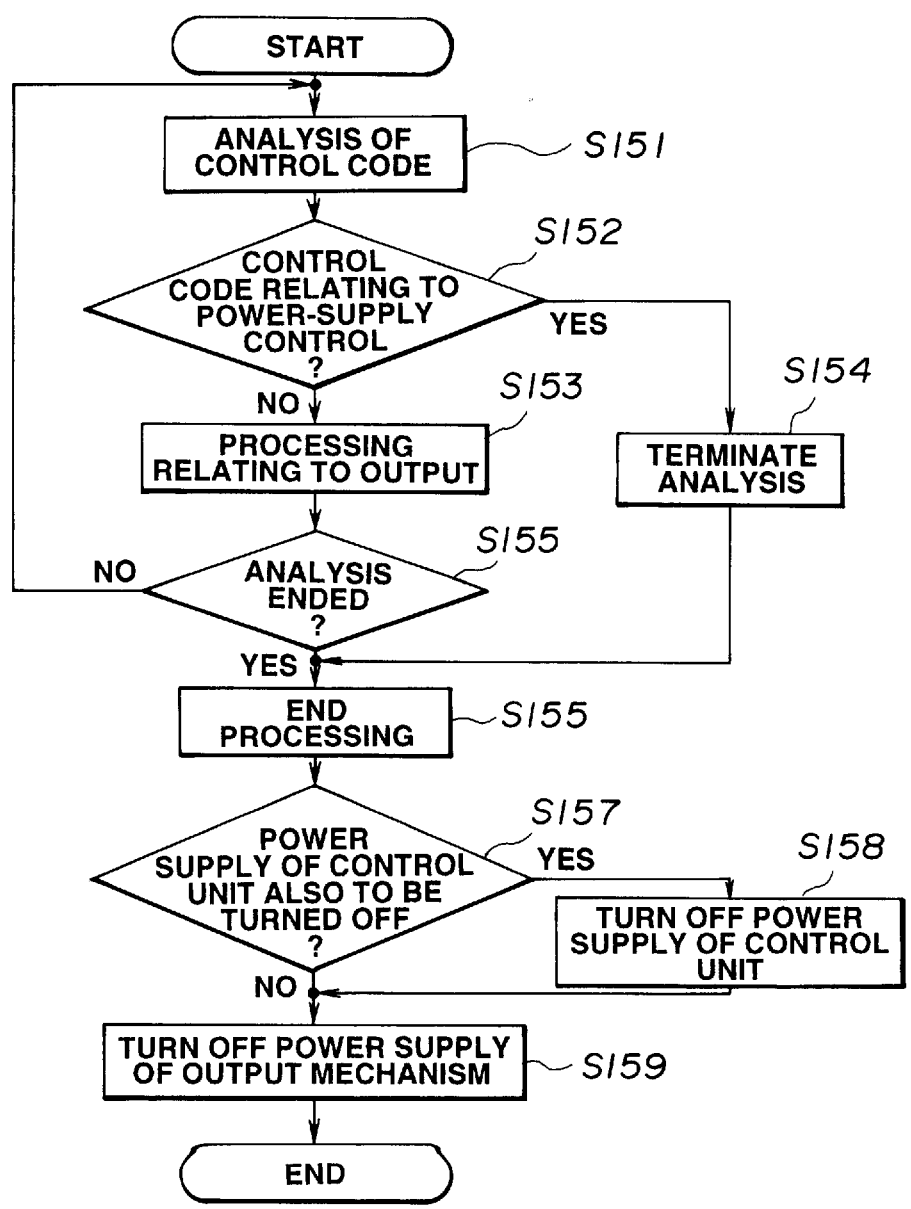
FIG. 26 is a flowchart illustrating a first current supply control procedure in the printing system of the embodiment shown in FIG. 25.

FIG. 26 is a flowchart illustrating a power-supply control procedure in the printing apparatus of the present invention. Steps S151–S159 indicate respective steps in the procedure. The control procedure is stored in a ROM within power-supply control unit 3008 comprising a CPU and the like.

When data is transmitted from host computer 1, a control code in the data is analyzed in step S151. If the control code is determined to be a control code relating to power-supply control in step S152, the analysis is terminated (step S154), and end processing is performed in step S156. In step S157, the CPU determines if electric power supply to control unit 3002 must be interrupted based on the control code. If the result of the determination is affirmative, electric power supply to control unit 3002 is interrupted, and the process proceeds to step S159. If the result of the determination is negative, electric power supply to output mechanism 3009 is interrupted (step S159), and the process is terminated.

If the result of the determination in step S152 is negative, processing relating to an output operation is performed (step S153), and the CPU determines if the analysis has ended (step S155). If the result of the determination is negative, the process returns to step S151. If the result of the determination is affirmative, the process proceeds to step S156, in which end processing is performed.

The control operation to interrupt electric power supply to at least one of control unit 3002 and output mechanism 3009 of printing apparatus 3000 when data has not been transmitted from host computer 1 for at least a predetermined time period will now be described in detail.

Figure 27:
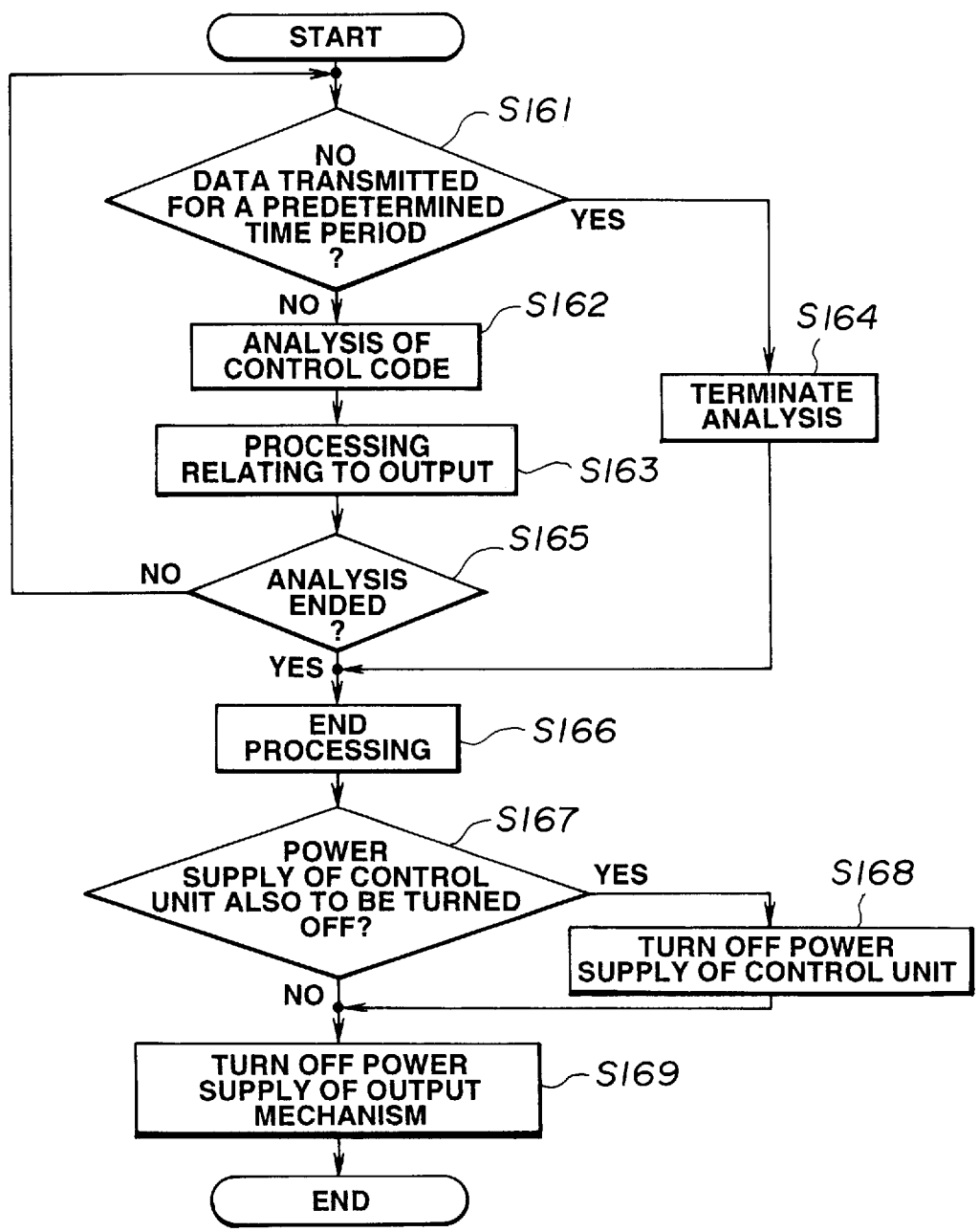
FIG. 27 is a flowchart illustrating a second current supply control procedure in the printing system of the embodiment shown in FIG. 25.

FIG. 27 is a flowchart illustrating another power-supply control procedure in the printing apparatus of the present invention. Steps S161–S169 indicate respective steps of the procedure. The control procedure is stored in the ROM within power-supply control unit 3008 comprising the CPU and the like.

First, the CPU determines if data has not been transmitted from host computer 1 for at least a predetermined time period based on the detection state of input data by data-input detection unit 3007 (step S161). If the result of the determination is affirmative, processing of analyzing a control code is terminated (step S164), and the process proceeds to step S166, in which end processing is performed. In step S167, the CPU determines if electric power supply to control unit 3002 must be interrupted. If the result of the determination is affirmative, electric power supply to control unit 3002 is interrupted in step S168, and the process proceeds to step S169. If the result of the determination is negative, electric power supply to output mechanism 3009 is interrupted (step S169), and the process is terminated.

If the result of the determination in step S161 is negative, control-code analysis unit 3005 analyzes the control code transmitted from host computer 1 to input unit 3004 (step S162). After performing processing relating to an output operation (step S163), the CPU determines if the analysis has ended (step S165). If the result of the determination is negative, the process returns to step S161. If the result of the determination is affirmative, the process proceeds to step S166, in which end processing is performed.

The control operation to cause electric power supply to at least one of control unit 3002 and output mechanism 3009 of printing apparatus 3000 when input data has been received from host computer 1 in a state in which electric power supply is interrupted will now be described in detail.

Figure 28:
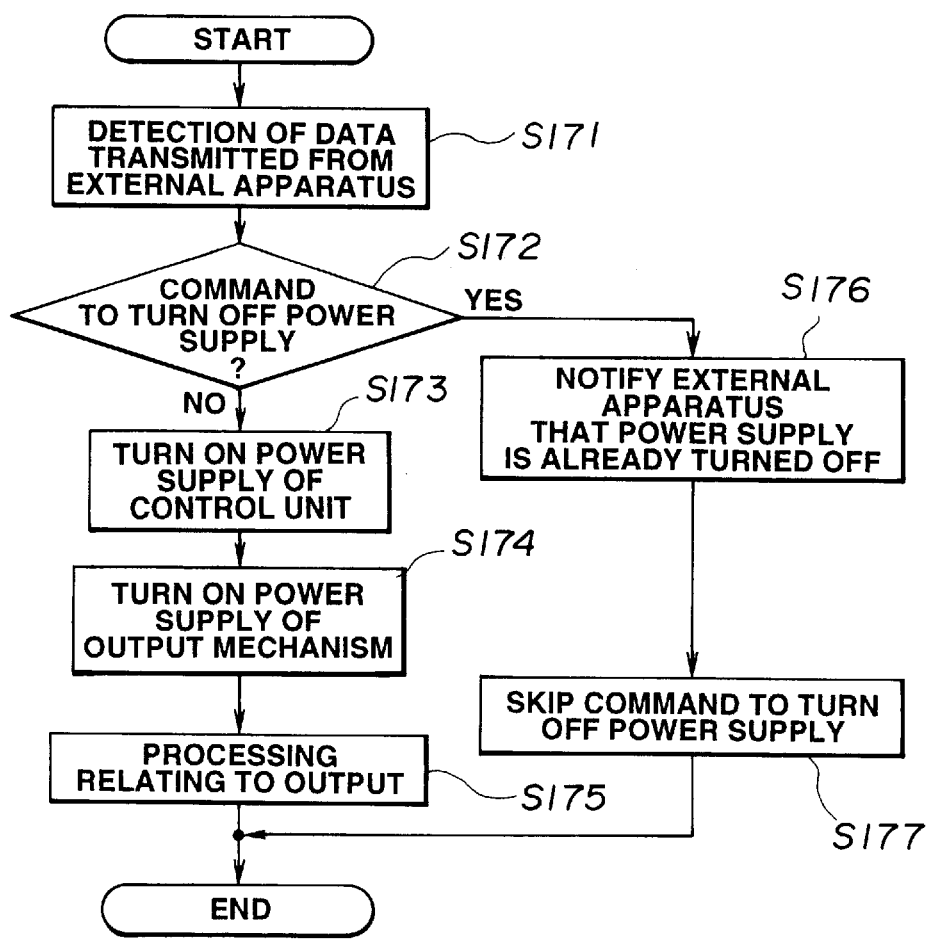
FIG. 28 is a flowchart illustrating a third current supply control procedure in the printing system of the embodiment shown in FIG. 25.

FIG. 28 is a flowchart illustrating still another power-supply control procedure in the printing apparatus of the present invention. Steps S171–S177 indicate respective steps in the procedure. The control procedure is stored in ROM's provided within power-supply control unit 3008 and data-input detection unit 3007, each comprising a CPU, a control circuit and the like.

When data-input detection unit 3007 has detected that data has been transmitted from host computer 1 while electric power supply to control unit 3002 of printing apparatus 3000 has been interrupted (step S171), the CPU determines if the transmitted data comprises a command to turn off the power supply (step S172). If the result of the determination is negative, power-supply control unit 3008 controls power supply unit 3010 so as to supply electric power to control unit 3002 (step S173), and also to output mechanism 3009 (step S174). There after, processing relating to an output operation is performed (step S175), and the process is terminated. If the result of the determination in step S172 is affirmative, host computer 1 is notified that the power supply is already turned off (step S176), the transmitted data is skipped (step S177), and the process is terminated.

In the above-described embodiments, means to turn off the power supply according to a control code and when data has not been transmitted for at least a predetermined time period may be applied not only to the output mechanism (laser printing mechanism) shown in the embodiments, but also to a printing apparatus including any other printer engine, such as an ink-jet printer engine, a dot-matrix printer engine or the like.

The apparatus to which the fact that the power supply is turned off is notified is not limited to an external apparatus, but may be a display unit (a panel or a buzzer) of the printing apparatus. Alternatively, the fact may not be notified.

Any units other than control unit 3002 and output mechanism 3009 may be included in the units for which electric power supply is controlled. Alternatively, the power supply of output mechanism 3009 may be turned on or off prior to control unit 3002. Thereafter, the power supply of control unit 3002 may be turned on or off after the lapse of a predetermined time period. In another approach, the power supply may not be controlled.

Output mechanism 3009 is not limited to the above-described one. For example, an original-feeding device for performing pre-processing of sheets which can be optionally connected, a sorter device for performing post-processing of sheets, and the like may be adopted as output mechanisms. By performing electric power supply control while combining such devices with the above-described units to be controlled, it is possible to provide a printing apparatus having a high efficiency of electric power consumption.

Data to instruct interruption of electric power supply from host computer 1 is not limited to a dedicated control command, but may have any other data format.

Figure 30:
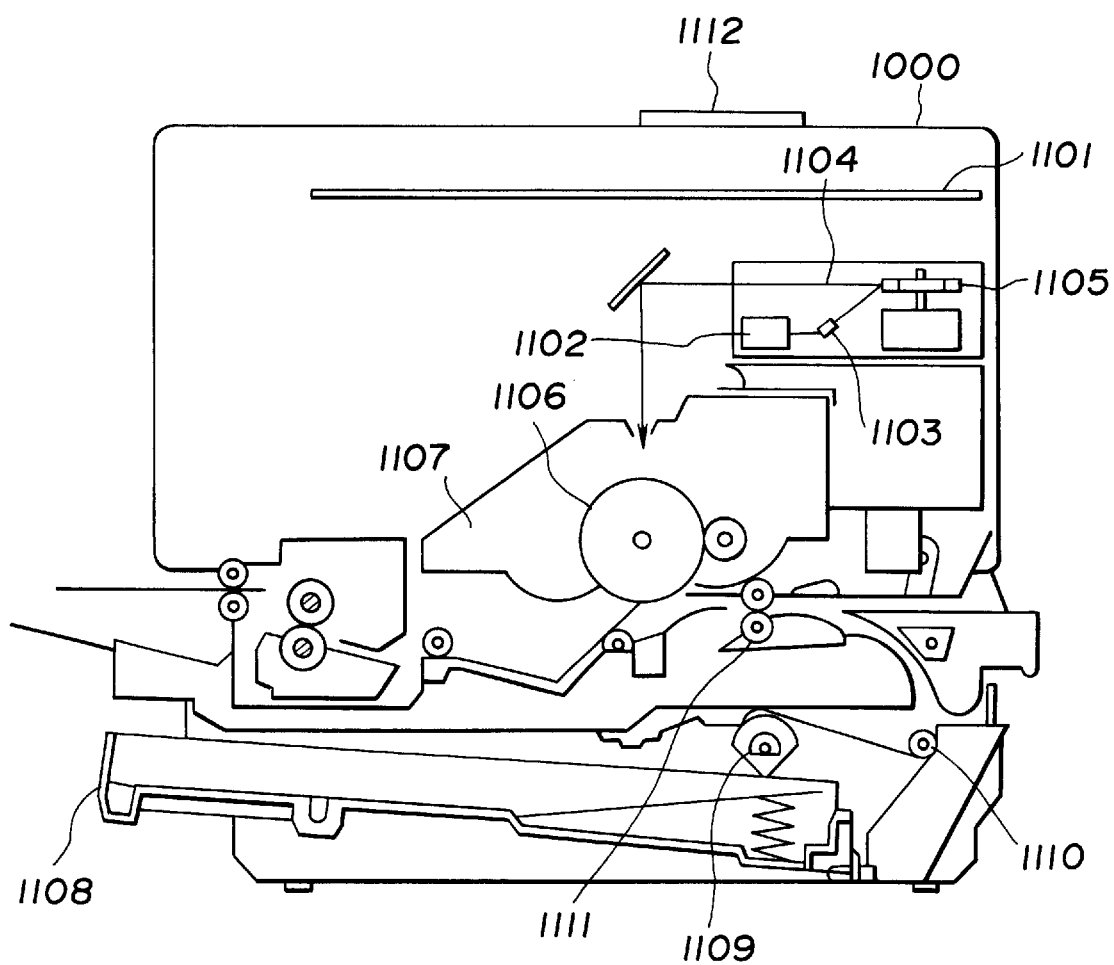
FIG. 30 is a cross-sectional view illustrating the configuration of a laser-beam printer to which the present invention is applied.

FIG. 30 is a cross-sectional view illustrating the configuration of a laser-beam printer to which any of the above-described embodiments can be applied. The printer is configured such that character patterns and form data can be registered from a data source (not shown).

In FIG. 30, reference numeral 1000 represents a main body of a laser-beam printer (LBP) (hereinafter simply termed a "main body"). Main body 1000 inputs and stores character information (character codes), form information, macrocommands and the like supplied from an external apparatus connected thereto, such as host computer 1 shown in FIG. 1, or the like, forms character patterns, a form pattern and the like, which correspond to the information, in accordance with the information, and forms an image on recording paper, serving as a recording medium. Operation panel 1112 includes switches for various operations, and an LED (light-emitting diode) display unit or an LCD (liquid-crystal display) unit for displaying the state of the printer. Printer control unit 1101 controls the entire LBP 1000, and analyzes character information and the like supplied from host computer 1. Printer control unit 1101 mainly converts character information into a video signal representing corresponding character patterns, and outputs the signal to laser driver 1102. Laser driver 1102 is a circuit for driving semiconductor laser 1103, and performs on/off control of laser light 1104 emitted from semiconductor laser 1103 in accordance with the input video signal. An electrostatic latent image of character patterns is thereby formed on electrostatic drum 1106.

This latent image is developed by developing unit 1107 provided around electrostatic drum 1106, and the developed image is transferred onto recording paper. The recording paper comprises cut sheets, which are accommodated within sheet cassette 1108 mounted in main body 1000. Each sheet is fed into the apparatus by sheet-feeding roller 1109 and conveying rollers 1110 and 1111, and is supplied to electrostatic drum 1106.

Figure 31:
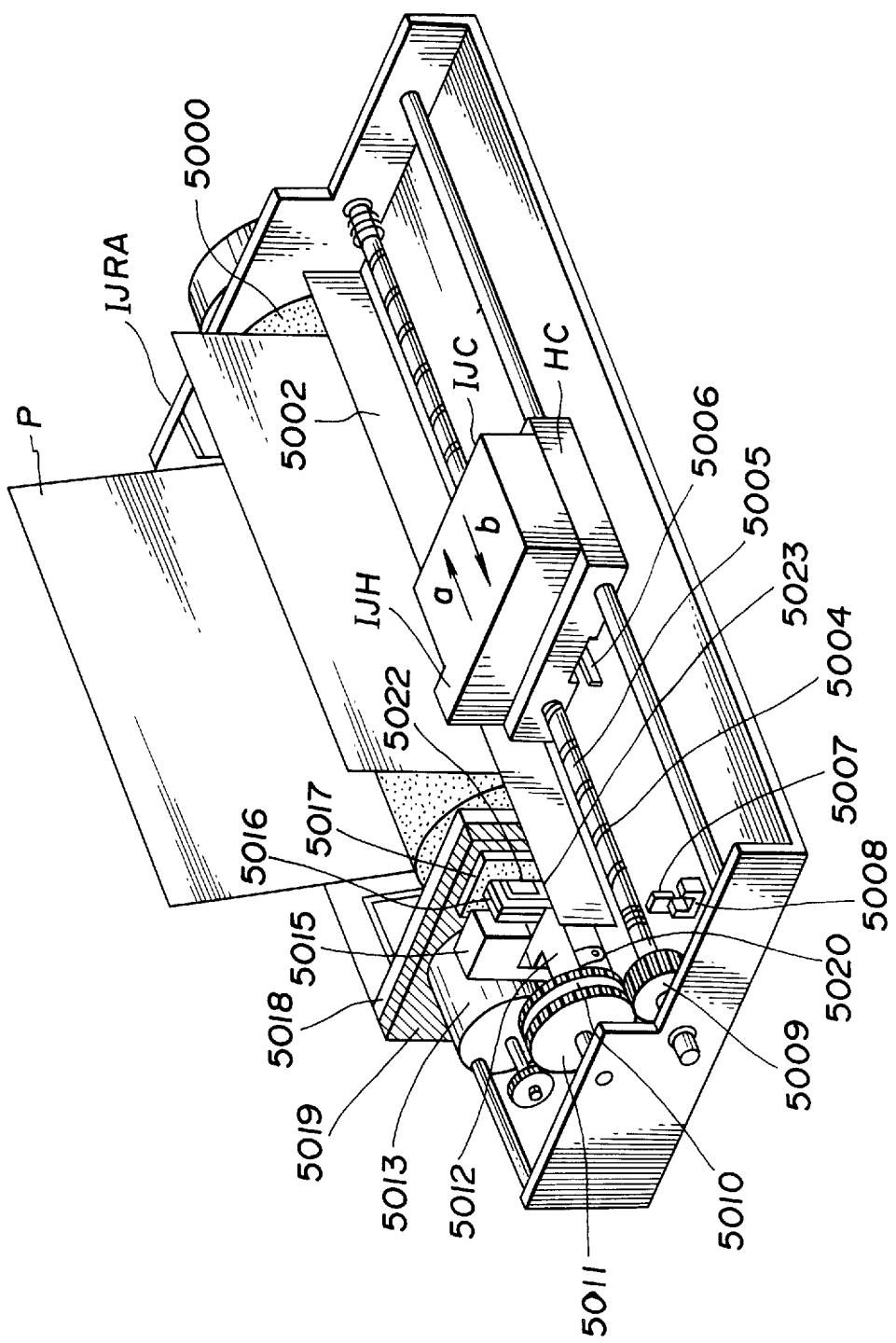
FIG. 31 shows an external appearance illustrating the configuration of an ink-jet printer to which the present invention is applied.

FIG. 31 is an external view illustrating the configuration of a printing apparatus to which any of the above-described embodiments can be applied, and illustrates an ink-jet recording apparatus (IJRA).

In FIG. 31, carriage HC which engages with helical groove 5004 of lead screw 5005 rotating via driving-force transmission gears 5011 and 5009 in accordance with the forward or reverse rotation of driving motor 5013 includes a pin (not shown), and is reciprocated in the directions of arrows a and b. Ink-jet cartridge IJC is mounted on carriage HC. Sheet-pressing plate 5002 presses the sheet of recording paper against platen 5000 along the moving direction of carriage HC. Photocoupler components 5007 and 5008 serve as home-position detection means for confirming the presence of lever 5006 of carriage HC in the region of these components, and performing, for example, switching of the direction of rotation of driving motor 5013. Member 5016 supports cap member 5022 which caps the front surface of the recording head. Reference numeral 5015 represents suction means for sucking the inside of the cap, which performs a suction recovery operation of the recording head via opening 5023 of the cap. Cleaning blade 5017 can be moved back and forth by member 5019. Supporting plate 5018 of the main body of the apparatus supports cleaning blade 5017 and member 5019. Reference numeral 5012 represents a lever for starting suction for a suction recovery operation, which moves in accordance with the movement of cam 5020, which engages with carriage HC. The driving force of driving motor 5013 is transmitted by known transmission means, such as a clutch or the like, to move lever 5012.

The apparatus is configured so that each of the above-described capping, cleaning and suction recovery operations is performed at the corresponding position by the function of lead screw 5005 when carriage HC reaches the region of the home-position side. These operations can be performed provided that a desired operation is performed with an appropriate timing.

The present invention may be applied to a system comprising a plurality of apparatuses, or to an apparatus comprising a single unit. The present invention may, of course, be applied to a case in which the invention is achieved by supplying a system or an apparatus with a program to execute the invention.

The individual components shown in outline or designated by blocks in the drawings are all well-known in the printing apparatus and information processing apparatus arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing apparatus comprising:

image data receiving means for receiving image data sent from an image data source;

command data receiving means for receiving command data sent from the image data source;

first supply means for controllably supplying said image data receiving means with power from a power source;

second supply means for supplying said command data receiving means with power from the power source, said first supply means being controllable independently of said second supply means;

processing means for performing image processing on the received image data; and control means for controlling said first supply means to supply power to at least said image data receiving means, wherein in a case that said command data receiving means receives a power-on command, said control means controls said first supply means to supply power to said image data receiving means in accordance with the received power-on command.

2. An apparatus according to claim 1, further comprising the power source, said power source having a first power source element for supplying power to said first supply means for at least said image data receiving means and a second power source element for supplying power to said second supply means for at least said command receiving means.

3. An apparatus according to claim 2, wherein said first power source element further supplies power to the image data source and to said processing means.

4. An apparatus according to claim 2, further comprising means for transmitting status data to the image data source, wherein when said first power source element cannot supply power, said status data transmitting means transmits status data representing that the first power source cannot supply power.

5. An apparatus according to claim 1, wherein the received image data includes control codes and character codes, and said processing means comprises means for analyzing the control codes.

6. An apparatus according to claim 1, wherein said processing means comprises means for forming an image in accordance with the received image data.

7. An apparatus according to claim 1, wherein in a case that said command receiving means receives a power-off command, said control means controls said first supply means to stop the supply of power to said image data receiving means in accordance with the power-off command.

8. An image processing method in an image processing apparatus, comprising:

a step of receiving image data sent from an image data source using an image data receiving means;

a step of receiving command data sent from the image data source using a command data receiving means;

a first supply step of controllably supplying the image data receiving means with power from a power source;

a second supply step of supplying the command data receiving means with power from the power source, said first supply step being controllable independently of said second supply step;

a step of performing image processing on the received image data; and a step of controlling said first supply step to supply power to at least the image receiving means, wherein in a case that said command data receiving step receives a power-on command, said control step controls said first supply step to supply power to the image data receiving means in accordance with the received power-on command.

9. A method according to claim 8, wherein the image processing apparatus includes the power source, the power source having a first power source element for supplying power for said first supply step for at least the image data receiving means and a second power source element for supplying power for said second supply step for at least the command receiving means.

10. A method according to claim 9, further comprising a step of transmitting status data to the image data source, wherein when the first power source element cannot supply power, said status data transmitting step transmits status data representing that the first power source cannot supply power.

11. A method according to claim 8, wherein said processing step comprises a step of forming an image in accordance with the received image data.

12. An image data generating apparatus comprising:

means for transmitting image data to an image processing apparatus that includes image data receiving means and a first power source for supplying power to the image data receiving means;

means for transmitting command data to the image processing apparatus, wherein a power-on command designating a start of supply of power to the image data receiving means may be transmitted by said command data transmitting means;

means for receiving status data sent from the image processing apparatus indicative of a condition of the image processing apparatus; and control means for displaying condition of data of the image processing apparatus on a display unit in accordance with the received status data, wherein when said status data receiving means receives status data representing that the first power source cannot supply power, said control means displays on the display unit condition data showing that the first power source cannot supply power.

13. An apparatus according to claim 12, wherein a power-off command for designating a stop of supply of power to the image data receiving means may be transmitted by said data transmitting means.

14. A method for reducing a power consumption for an image processing apparatus, the image processing apparatus having means for receiving image data sent from an image data source and means for performing an image processing on the received image data, the method comprising the steps of:

discriminating when power-on command data is received from the image data source by command data receiving means different from the image data receiving means; and causing supply of power to the image data receiving means when power is not supplied to the image data receiving means and the command data receiving means discriminates that power-on command data has been received.

15. A method according to claim 14, further comprising a step of transmitting status data representing that the power cannot be supplied to the image data receiving means when the power on command data is received and power cannot be supplied to the image data receiving means.

16. A method according to claim 14, wherein the processing means comprises means for forming an image in accordance with the received image data, and a power supply to the image forming means is controlled in said causing step.

17. A method according to claim 14, further comprising a step of discriminating when power-off command data is received from the image data source by the command data receiving means, and a step of causing shutting off of the power supply to the image data receiving means when the power is supplied to the image data receiving means and power-off command data has been received.

18. An image processing method of transmitting print data and control command data using first and second channels respectively, comprising the steps of:

discriminating whether print data transmission using the first channel is prohibited or allowed on the basis of the control command data transmitted through the second channel, and prohibiting or allowing print data transmission through the first channel on the basis of a result in the discrimination.

19. A method according to claim 18, wherein print data transmission through the first channel is prohibited or allowed according to a state of power supply to a print data receiving means.

20. A method according to claim 18, wherein said discriminating step is executed in response to reception of the control command data which requests a print data receiving apparatus to be in a print data receivable state.

21. A method according to claim 20, further comprising a step of transmitting status data representing that the print data transmission is prohibited to a print data transmitting apparatus when it is discriminated in said discriminating step that the print data transmission is prohibited.

22. A method of transmitting print data through a first channel, comprising the steps of:

transmitting control command data which requests a print data receiving apparatus to be in a print data receivable state, using a second channel different from the first channel for print data transmission when said print data receiving apparatus is not in the print data receivable state, and discriminating whether or not print data is transmitted on the basis of status data indicative of the state of said print data receiving apparatus, which is sent back from said print data receiving apparatus in response to the control command data transmitted in said transmitting step.

23. A method according to claim 22, wherein the control command data requesting said print data receiving apparatus to be in the print data receivable state is a control command requesting power supply to at least print data receiving means of said print data receiving apparatus.

24. A method according to claim 22, further comprising a step of displaying that transmission of print data is prohibited when the status data represents that said print data receiving apparatus is not in the print data receivable state.

25. A method of receiving print data and control command data to be transmitted using first and second channels, respectively, comprising the steps of:

discriminating whether or not the received control command data through the second channel requests to be in a print data receivable state when the control command data is received during a print data unreceivable state, and prohibiting or allowing print data transmission on the basis of a result in the discrimination.

26. A method according to claim 25, wherein the transmission of print data is prohibited or allowed according to a state of power supply to a print data receiving means.

27. A method according to claim 25, further comprising a second step of discriminating whether the print data receivable state can be set or not, and a step of transmitting status data representing that print data transmission is prohibited to print data transmitting apparatus when it is discriminated in said second discriminating step that the print data receivable state cannot be set.

28. A transmission system for transmitting print data and control command data using first and second channels, respectively, comprising:

means for discriminating whether print data transmission using the first channel is prohibited or allowed on the basis of the control command data transmitted through the second channel, and means for prohibiting or allowing print data transmission through the first channel on the basis of a result in the discrimination.

29. A transmission system according to claim 28, wherein the prohibition or allowing means prohibits or allows print data transmission through the first channel according to a state of power supply to print data receiving means.

30. A transmission system according to claim 28, wherein the discriminating means discriminates whether the print data transmission is prohibited or allowed in response to reception of the control command data requesting a print data receiving apparatus to be in a print data receivable state.

31. A transmission system according to claim 30, further comprising means for transmitting status data representing that print data transmission is prohibited to print data transmitting apparatus when said discriminating means discriminates that the print data transmission is prohibited.

32. A print data transmitting apparatus for transmitting print data through a first channel, comprising:

means for transmitting control command data requesting a print data receiving apparatus to be in a print data receivable state using a second channel different from the first channel for print data transmission when said print data receiving apparatus is not in a print data receivable state;

means for receiving status data indicative of a state of said print data receiving apparatus, which is sent back from said print data receiving apparatus in response to the control command data transmitted by said transmitting means; and means for discriminating whether print data is transmitted or not on the basis of the received status data.

33. A print data transmitting apparatus according to claim 32, wherein the control command data requesting said print data receiving apparatus to be in the print data receivable state is a control command requesting power supply to at least print data receiving means of said print data receiving apparatus.

34. A print data transmitting apparatus according to claim 32, further comprising means for displaying that the print data transmission is prohibited, when the received status data represents that said print data receiving apparatus is not in the print data receivable state.

35. A print data receiving apparatus for receiving print data transmitted through a first channel, comprising:

means for receiving control command data which is transmitted using a second channel different from the first channel for transmitting print data;

means for discriminating whether or not the received control command data requests a print data receiving apparatus to be in a print data receivable state; and means for prohibiting or allowing print data transmission on the basis of a result in the discrimination.

36. A print data receiving apparatus according to claim 35, wherein the prohibition or allowing means prohibits or allows the print data transmission according to a state of the power supply of print data receiving apparatus.

37. A print data receiving apparatus according to claim 35, further comprising second discriminating means for discriminating whether said print data receiving apparatus can be in the print data receivable state or not and means for transmitting status data representing that the print data transmission is prohibited to a print data transmitting apparatus when said discriminating means discriminates that said print data receiving means cannot be in the print data receivable state.

\* \* \* \* \*

UNITED STATES PATENT AND TRADEMARK OFFICE
CERTIFICATE OF CORRECTION

PATENT NO. : 5,867,720

DATED : February 2, 1999

INVENTOR(S) : YOSHIAKI HIRANO

It is certified that error appears in the above-identified patent and that said Letters Patent is hereby corrected as shown below:

```
  On the title page
[56] REFERENCES CITED

U.S. Patent Documents
   "Pcikert" should read --Pickert--.

Foreign Patent Documents
   "03168820" should read --3-1688620--

Other Publications
   "LaserJet" should read --LaserJet 4L--.
   Drawings
SHEET 1

FIG. 1 should be replaced by attached amended Fig. 1.

SHEET 3

FIG. 3 should be replaced by attached amended Fig. 3.

SHEET 4

FIG. 4 should be replaced by attached amended Fig. 4.
```

UNITED STATES PATENT AND TRADEMARK OFFICE
CERTIFICATE OF CORRECTION

PATENT NO. : 5,867,720

DATED : February 2, 1999

INVENTOR(S) : YOSHIAKI HIRANO

It is certified that error appears in the above-identified patent and that said Letters Patent is hereby corrected as shown below:

SHEET 6

FIG. 6 should be replaced by attached amended Fig. 6.

SHEET 7

FIG. 7 should be replaced by attached amended Fig. 7.

SHEET 8

FIG. 8 should be replaced by attached amended Fig. 8.

SHEET 10

FIG. 10 should be replaced by attached amended Fig. 10.

SHEET 11

FIG. 11 should be replaced by attached amended Fig. 11.

SHEET 12

FIG. 12 should be replaced by attached amended Fig. 12.

UNITED STATES PATENT AND TRADEMARK OFFICE
CERTIFICATE OF CORRECTION

PATENT NO. : 5,867,720

DATED : February 2, 1999

INVENTOR(S) : YOSHIAKI HIRANO

It is certified that error appears in the above-identified patent and that said Letters Patent is hereby corrected as shown below:

SHEET 15

FIG. 15 should be replaced by attached amended Fig. 15.

SHEET 16

FIG. 16 should be replaced by attached amended Fig. 1.

SHEET 24

FIG. 24 should be replaced by attached amended Fig. 24.

SHEET 29

FIG. 29 should be replaced by attached amended Fig. 29.

COLUMN 7

Line 17, "S8" should read --58 to--.

UNITED STATES PATENT AND TRADEMARK OFFICE
CERTIFICATE OF CORRECTION

PATENT NO. : 5,867,720

DATED : February 2, 1999

INVENTOR(S) : YOSHIAKI HIRANO

It is certified that error appears in the above-identified patent and that said Letters Patent is hereby corrected as shown below:

COLUMN 11

Line 65, "proceeds" should read --process proceeds--;
     and "steps" should read --step--.

COLUMN 12

Line 51, "proceeds to steps" should read --process
     proceeds to step--.

COLUMN 13

Line 44, "antenna" should read --antennae--.

COLUMN 19

Line 23, "current" should read --current.--.

COLUMN 20

Line 25, "possible" should read --possible to--.

UNITED STATES PATENT AND TRADEMARK OFFICE
CERTIFICATE OF CORRECTION

PATENT NO. : 5,867,720

DATED : February 2, 1999

INVENTOR(S) : YOSHIAKI HIRANO

It is certified that error appears in the above-identified patent and that said Letters Patent is hereby corrected as shown below:

COLUMN 26

Line 5, "power on" should read --power-on--.

Signed and Sealed this

Twenty-seventh Day of February, 2001

Attest:

NICHOLAS P. GODICI

Attesting Officer

Acting Director of the United States Patent and Trademark Office